(12) United States Patent
Kabir et al.

(10) Patent No.: US 11,135,567 B1
(45) Date of Patent: Oct. 5, 2021

(54) MICROCRYSTALLINE CELLULOSE PARTICLE SUPPORTED SOL-GEL SORBENTS AND METHODS OF MANUFACTURING THE SAME

(71) Applicants: Abuzar Kabir, Miami, FL (US); Kenneth G. Furton, Miami, FL (US)

(72) Inventors: Abuzar Kabir, Miami, FL (US); Kenneth G. Furton, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 16/913,222

(22) Filed: Jun. 26, 2020

(51) Int. Cl.
| | |
|---|---|
| *B01J 20/32* | (2006.01) |
| *B01J 20/26* | (2006.01) |
| *B01J 20/28* | (2006.01) |
| *B01J 20/291* | (2006.01) |
| *B01J 20/30* | (2006.01) |
| *B01J 20/10* | (2006.01) |

(Continued)

(52) U.S. Cl.
CPC ........ *B01J 20/3214* (2013.01); *B01D 15/161* (2013.01); *B01J 20/103* (2013.01); *B01J 20/267* (2013.01); *B01J 20/28026* (2013.01); *B01J 20/28047* (2013.01); *B01J 20/291* (2013.01); *B01J 20/3085* (2013.01); *B01J 20/3208* (2013.01); *B01J 20/3234* (2013.01); *G01N 30/30* (2013.01); *B01J 20/3021* (2013.01)

(58) Field of Classification Search
CPC ............ B01J 20/28016; B01J 20/28026; B01J 20/28047; B01J 20/28002; B01J 20/103; B01J 20/26; B01J 20/267; B01J 20/291; B01J 20/3021; B01J 20/3085; B01J 20/32; B01J 20/3234; B01J 20/3214; B01J 20/3208; B01D 15/161; G01N 30/30

See application file for complete search history.

(56) References Cited

U.S. PATENT DOCUMENTS 6,350,422 B1 * 2/2002 Khare ................... B01D 53/02
                                                    210/660
9,283,544 B2   3/2016 Kabir et al.
(Continued)

FOREIGN PATENT DOCUMENTS

WO     WO-2010019077 A1 * 2/2010 ........... C12H 1/0408

OTHER PUBLICATIONS

Trache et al. Microcrystalline cellulose: Isolation, characterization and bio-composites application—A review. International Journal of Biological Macromolecules 93 (2016) 789-804. (Year: 2016).*

(Continued)

*Primary Examiner* — Katherine Zalasky McDonald
(74) *Attorney, Agent, or Firm* — Saliwanchik, Lloyd & Eisenschenk

(57) ABSTRACT

Solid phase extraction (SPE) sorbents and liquid chromatography (LC) stationary phases are provided, as well as methods of fabricating the same. The SPE sorbents and LC stationary phases can use microcrystalline cellulose particles as the substrate and sol-gel sorbent coating technology as the polymer/sorbent immobilization technology. The SPE sorbents and LC stationary phases are stable in a pH range of 1-13 and at a temperature of up to 350° C.

20 Claims, 30 Drawing Sheets

(51) Int. Cl.
*B01D 15/16* (2006.01)
*G01N 30/30* (2006.01)

(56) References Cited

U.S. PATENT DOCUMENTS

| | | | | |
|---|---|---|---|---|
| 2004/0129141 | A1* | 7/2004 | Malik | G01N 30/56 96/101 |
| 2005/0016923 | A1* | 1/2005 | Marquez-Sanchez | B01J 20/3293 210/644 |
| 2012/0032111 | A1* | 2/2012 | Edmiston | B01J 20/0229 252/184 |
| 2013/0012379 | A1 | 1/2013 | Edmiston | |
| 2014/0135212 | A1* | 5/2014 | Edmiston | B01J 20/103 502/402 |
| 2016/0228849 | A1* | 8/2016 | Le | B01J 20/28004 |
| 2016/0263554 | A1* | 9/2016 | Grubbs | B01D 71/08 |
| 2017/0291158 | A1* | 10/2017 | Kabir | B01D 15/20 |

OTHER PUBLICATIONS

Bernards et al. Hydrolysis-condensation processes of the tetra-alkoxysilanes TPOS, TEOS and TMOS in some alcoholic solvents. Journal of Non-Crystalline Solids 134 (1991) 1-13. (Year: 1991).*
Brinker, C. Jeffrey. Ch. 3 "Hydrolysis and condensation II: Silicates," Sol-gel science: the physics and chemistry of sol-gel processing. (c) 1990 by Academic Press Inc. San Diego, CA., p. 96-233. (Year: 1990).*
Wikipedia, "Sol-gel process," revision dated Apr. 26, 2019, 9 pages. (Year: 2019).*
Sioufii, A.-M. Silica gel-based monoliths prepared by the sol-gel method: facts and figures. Journal of Chromatography A, 1000 (2003) 801-818. (Year: 2003).*
Marchisio et al. Effect of Mixing and Other Operating Parameters in Sol-Gel Processes. Ind. Eng. Chem. Res. 2008, 47, 7202-7210 . (Year: 2008).*
Danks et al. The evolution of 'sol-gel' chemistry as a technique for materials synthesis. Mater. Horiz., 2016, 3, p. 91-112. (Year: 2016).*
Yu Yang, Subcritical water chromatography: A green approach to high-temperature liquid chromatography, J. Sept. Sci 2007, 300, 1131-1140.
Camila R.M. Vigna et al., Preparation of stationary phases for reversed-phase high-performance liquid chromatography using thermal treatments at high temperature, Journal of Chromatograph A, 1156 (2007) 60-67.
Luisa Pereira et al., High temperature to increase throughput in liquid chromatography and liquid chromatography-mass spectrometry with a porous graphitic carbon stationary phase, J. Sep. Sci 2007, 30,1115-1124.
Clayton V. McNeff et al., Practice and theory of high temperature liquid chromatography, J. Sep. Sci. 2007, 30, 1672-1685.
Sherry Shen et al., High Temperature High Performance Liquid Chromatography of Substituted Anilines using a C18 Hybrid Stationary Phase, Journal of Liquid Chromatography & Related Technologies, 29: 2823-2834, 2006.
M. Marsin Sanagi et al., High Temperature Liquid Chromatography on a Poly (Styrene-Divinylbenzene) Stationary Phase, Journal of Liquid Chromatograph & Related Technologies, 28: 3065-3076, 2005.
D. Guillarme et al., Detection Modes with High Temperature Liquid Chromatography—A Review, Separation & Purification Reviews, 34:181-216, 2005.
Yu Yang, Stationary Phases for High-Temperature Liquid Chromatography, Recent Developments in LC Column Technology, Jun. 2003.
Endler M. Borges et al., An appraisal of the chemical and thermal stability of silica based reversed-phase liquid chromatographic stationary phases employed within the pharmaceutical environment, Journal of Pharmaceutical and Biomedical Analysis 77 (2013) 100-115.
Szymon Bocian et al., Residual silanols at reversed-phase silica in HPLC—a contribution for a better understanding, J. Sep. Sci. 2012, 35, 1191-1200.
Kensuke Okusa et al., Test compounds for detecting the silanol effect on the elution of ionized amines in reversed-phase LC. J. Sep Sci. 2010, 33, 348-358.
Sudam K. Parida et al., Adsorption of organic molecules on silica surface, Advances in Colloid and Interface Science 121 (2006) 77-110.
P.K. Jal et al., Chemical modification of silica surface by immobilization of unctional groups for extractive concenlration of metal ions, Taianta 62 (2004) 1005-1028.
L.T. Zhuravlev, The surface chemistry of amorphous silica. Zhuravlev model, Colloids and Surfaces A: Physicochemical and Engineering Aspects 173 (2000) 1-38.
Salih Ozcubukcu et al., Organosilanols as Catalysts in Asymmetric Aryl Transfer Reactions, Organic Letters, 2005 vol. 7, No. 7, 1407-1409.
Jacek Nawrocki, The silanol group and its role in liquid chromatography, Journal of Chromatography A, 779 (1997) 29-71.
Gao et al., Preparation and chromatographic performance of a multifunctional immobilized chiral stationary phase based on dialdehyde microcrystalline cellulose derivatives, Chirality 2019; 31:669-681.
Ling-Zhi Meng et al., Preparation, Characterization, and Behavior of Cellulose-Titanium (IV) Oxide Modified with Organosilicone, Journal of Applied Polymer Science, vol. 84, 61-66 (2002).
JRS Pharma, PROSOLV® SMCC, silicified microcrystalline cellulose, www.jrspharma.com.
Saba Habibi et al., Sol-gel synthesis of carbon-doped TiO2 nanoparticles based on microcrystalline cellulose for efficient photocatalytic degradation of methylene blue under visible light, Environmental technology, 2019, https://doi.org/10.1080/09593330.20191604815.

* cited by examiner

| Compound | Chemical Structure | Log Kow | Molecular Weight |
|---|---|---|---|
| Furfuryl Alcohol (FA) | | 0.3 | 98.10 |
| Piperonal (PIP) | | 1.05 | 150.13 |
| Phenol (PHE) | | 1.5 | 94.11 |
| Benzodioxole (BDO) | | 2.08 | 122.12 |
| 4-Nitrotoluene (4NT) | | 2.45 | 137.14 |
| 9-Anthracene Methanol (9AM) | | 3.04 | 208.26 |
| Naphthalene (NAPH) | | 3.35 | 128.17 |
| 1,2,4,5-Tetramethyl Benzene (TMB) | | 4 | 134.22 |
| Triclosan (TCL) | | 4.53 | 289.54 |
| Diethylstilbestrol (DESB) | | 5.07 | 268.35 |

FIG. 14

MICROCRYSTALLINE CELLULOSE PARTICLE SUPPORTED SOL-GEL SORBENTS AND METHODS OF MANUFACTURING THE SAME

BACKGROUND

Porous silica particles are the predominant substrates used in liquid phase separation as the support for the chromatographic stationary phases and in sample preparation as the support for solid phase extraction sorbents. More than 90% of liquid phase stationary phases are based on silica substrates. Although silica particles are universally accepted as an ideal support for chromatographic stationary phases due to their good mechanical strength, high surface area, and reasonable chemical and thermal stability, silica based liquid chromatography (LC) stationary phases suffer from shortcomings, including limited pH stability (maximum stable pH range of 2-9), low maximum operating temperature (about 60° C.), and high concentration of surface silanol groups due to the incomplete derivatization. Silica supported LC stationary phases often suffer from broad and tailing peaks, increased retention, column-to-column irreproducibility, peak shape irreproducibility especially for basic compounds, and substantially different retention and selectivity parameter of the same phase obtained from different manufacturers.

The silica surface contains both silanols (Si—OH) and siloxanes (Si—O—Si) bonds as shown in FIG. 1. Silanol groups are strong adsorption sites, and silanols present on the surface are used to connect alkyl groups (e.g., C8, C18) in the bonded phases. However, due to steric hindrance, many silanol groups are not readily accessible and can't be linked to alkyl groups. As a result, some of the silanol groups remain unreacted, and these unreacted silanol groups are weakly acidic and pose great challenges for analyzing basic compounds.

Another major shortcoming of silica based LC stationary phases is poor pH stability. An acidic sample matrix with pH value lower than 2 makes the surface bonded organic ligands susceptible to chemical damage due to the hydrolysis of the siloxane bonds that anchor them to the silica surface. On the other hand, the silica backbone begins to dissolve at a pH of greater than 8. Basic compounds such as amines may require pH adjustment to a higher value so that they remain undissociated to facilitate their extraction/chromatographic separation as neutral entities. Due to the absence of high pH stable LC stationary phase, derivatization of both acidic and basic compounds is commonly used.

Yet another major shortcoming of silica based LC stationary phases is low thermal stability. A majority of popular LC stationary phases such as C18 offer stable chromatographic performance up to 60° C. At higher temperatures, the silica backbone tends to dissolve at a faster and unsustainable rate. Temperature is an important parameter that can be effectively utilized to modify the selectivity parameter of the LC stationary phase, to reduce the analysis time, to enhance column efficiency, and to improve detection sensitivity. However, due to the absence of LC stationary phases capable of withstanding high temperature, the potential advantages of this unique parameter largely remained untapped.

BRIEF SUMMARY

Embodiments of the subject invention provide novel and advantageous solid phase extraction (SPE) sorbents and liquid chromatography (LC) stationary phases and methods of fabricating the same. The SPE sorbents and LC stationary phases can use microcrystalline cellulose particles as the substrate and sol-gel sorbent coating technology as the polymer/sorb ent immobilization technology. The incorporation of microcrystalline cellulose particles and sol-gel sorbent coating technology provides SPE sorbents and LC stationary phases with substantially expanded pH stability (stable in pH range of 1-13) and high thermal stability (stable up to a temperature of 350° C. or even higher). Due to the elimination of acidic Si—OH bonds that would be present on a silica substrate, the SPE sorbents and LC stationary phases are not prone to adsorb basic compounds (e.g., amines), which is what happens in silica based LC stationary phases. The SPE sorbents and LC stationary phases overcome the shortcomings of conventional LC stationary phases (low pH stability, low thermal stability, wide selectivity variation due to the different content of residual surface silanol group, multistep synthesis and derivatization process), and they also make high temperature liquid chromatography (HTLC) more realistic, in which water on its own (i.e., only water) can be used as the mobile phase; the dielectric constant of water at 225° C. is comparable to that of acetonitrile at room temperature.

In an embodiment, a method of fabricating an SPE sorbent or LC stationary phase can comprise: activating microcrystalline cellulose particles by treatment with a solution; preparing a sol solution by dissolving a polymer in a solvent with an acidic sol-gel catalyst; and adding the activated microcrystalline cellulose particles to the sol solution such that the SPE sorbent or LC stationary phase is formed with the microcrystalline cellulose particles as a substrate. The method can further comprise: cleaning the activated microcrystalline cellulose particles and drying the cleaned activated microcrystalline cellulose particles prior to adding to the sol solution; and/or cleaning the SPE sorbent or LC stationary phase. The polymer can be, for example, octadecyl trimethoxysilane, polydimethyldiphenylsiloxane, polyethylene glycol, polytetrahydrofuran, (p-methyl phenyl) methyldimethoxysilane, 3,4-methylenedioxyphenyltriethoxysilane, hydroxyterminated poly(dimethyl siloxane), or monohydroxyterminated poly(dimethylsiloxane). The preparing of the sol solution can comprise dissolving the polymer in the solvent with the acidic sol-gel catalyst and a cross-linker.

In another embodiment, a composition can comprise: a substrate comprising microcrystalline cellulose particles; and a sol-gel sorbent coated on the substrate. The composition is stable in a pH range of 1-13 and at a temperature of 350° C. The sol-gel sorbent can be a polymer. The sol-gel sorbent can comprise, for example, octadecyl trimethoxysilane, polydimethyldiphenylsiloxane, polyethylene glycol, polytetrahydrofuran, (p-methyl phenyl) methyldimethoxysilane, 3,4-methylenedioxyphenyltriethoxysilane, hydroxyterminated poly(dimethyl siloxane), or monohydroxyterminated poly(dimethylsiloxane).

BRIEF DESCRIPTION OF DRAWINGS

FIG. 14 is a table showing a list of test compounds, along with the molar mass, polarity, and chemical structures of the test compounds.

FIG. 16 is a bar chart showing impact of conditioning temperature on acid-base dual catalyzed sol-gel poly(dimethyldiphenylsiloxane) sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 17 is a bar chart showing impact of conditioning temperature on acid-base dual catalyzed sol-gel C18 sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 18 is a bar chart showing impact of conditioning temperature on acid-base dual catalyzed sol-gel poly(ethylene glycol) sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 19 is a bar chart showing impact of conditioning temperature on acid-base dual catalyzed sol-gel poly(tetrahydrofuran) sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 20 is a bar chart showing impact of conditioning temperature on acid-catalyzed sol-gel poly(dimethyldiphenylsiloxane) sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 21 is a bar chart showing impact of conditioning temperature on acid-catalyzed sol-gel C18 sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 22 is a bar chart showing impact of conditioning temperature on acid-catalyzed sol-gel poly(ethylene glycol) sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 23 is a bar chart showing impact of conditioning temperature on acid-catalyzed sol-gel poly(tetrahydrofuran) sorbent coated microcrystalline cellulose particles. The data in the rows shown under the x-axis are represented respectively in the bar chart, where the first row is the front bar for each sorbent, the second row is the second bar from the front for each sorbent, and so on.

FIG. 24 is a bar chart showing a comparison of extraction efficiency values (%, absolute recovery) between acid-catalyzed and acid-base dual catalyzed sol-gel cellulose sorbents (ABC refers to acid-base dual catalyzed, and AC refers to acid-catalyzed). The data in the rows shown under the x-axis are represented respectively in the bar chart, where the first row is the front bar for each sorbent, the second row is the second bar from the front for each sorbent, and so on.

FIG. 25 is a bar chart showing a comparison of extraction efficiency values (%, absolute recovery) between commercial C18 and sol-gel silica C18 (acid-base dual catalyzed). The data in the rows shown under the x-axis are represented respectively in the bar chart, where the first row is the front bar for each sorbent, the second row is the second bar from the front for each sorbent, and so on.

FIG. 26 is a bar chart showing a comparison of extraction efficiency values (%, absolute recovery) between commercial C18 and sol-gel silica C18 (acid-catalyzed). The data in the rows shown under the x-axis are represented respectively in the bar chart, where the first row is the front bar for each sorbent, the second row is the second bar from the front for each sorbent, and so on.

FIG. 27 is a bar chart showing a comparison of extraction efficiency values (%, absolute recovery) between commercial C18, sol-gel cellulose C18, sol-gel cellulose poly(dimethyldiphenylsiloxane), sol-gel cellulose poly(ethylene glycol), and sol-gel cellulose poly(tetrahydrofuran). The data in the rows shown under the x-axis are represented respectively in the bar chart, where the first row is the front bar for each sorbent, the second row is the second bar from the front for each sorbent, and so on.

FIG. 28 is a bar chart showing a comparison of Si, 0, C loading between cellulose particles, commercial C18, and microcrystalline cellulose supported different sol-gel sorbents and stationary phases. The data in the rows shown under the x-axis are represented respectively in the bar chart, where the first row is the front bar for each sorbent, the second row is the second bar from the front for each sorbent, and so on.

DETAILED DESCRIPTION

Embodiments of the subject invention provide novel and advantageous solid phase extraction (SPE) sorbents (or sol-gel sorbents) and liquid chromatography (LC) stationary phases and methods of fabricating the same. The SPE sorbents and LC stationary phases can use microcrystalline cellulose particles as the substrate and sol-gel sorbent coating technology as the polymer/sorbent immobilization technology. The incorporation of microcrystalline cellulose particles and sol-gel sorbent coating technology provides SPE sorbents and LC stationary phases with substantially expanded pH stability (stable in pH range of 1-13) and high thermal stability (stable up to a temperature of 350° C. or even higher). Due to the elimination of acidic Si—OH bonds that would be present on a silica substrate, the SPE sorbents and LC stationary phases are not prone to adsorb basic compounds (e.g., amines), which is what happens in silica based LC stationary phases. The SPE sorbents and LC stationary phases overcome the shortcomings of conventional LC stationary phases (low pH stability, low thermal stability, wide selectivity variation due to the different content of residual surface silanol group, multistep synthesis and derivatization process), and they also make high temperature liquid chromatography (HTLC) more realistic, in which water on its own (i.e., only water) can be used as the mobile phase; the dielectric constant of water at 225° C. is comparable to that of acetonitrile at room temperature. Embodiments of the subject invention can replace related art SPE sorbents and LC stationary phases and methods of fabricating the same. It is also noted that HTLC could lead to elimination of expensive, toxic, and environment-polluting organic modifiers (methanol, acetonitrile) by using 100% water as the mobile phase.

Figure 1:
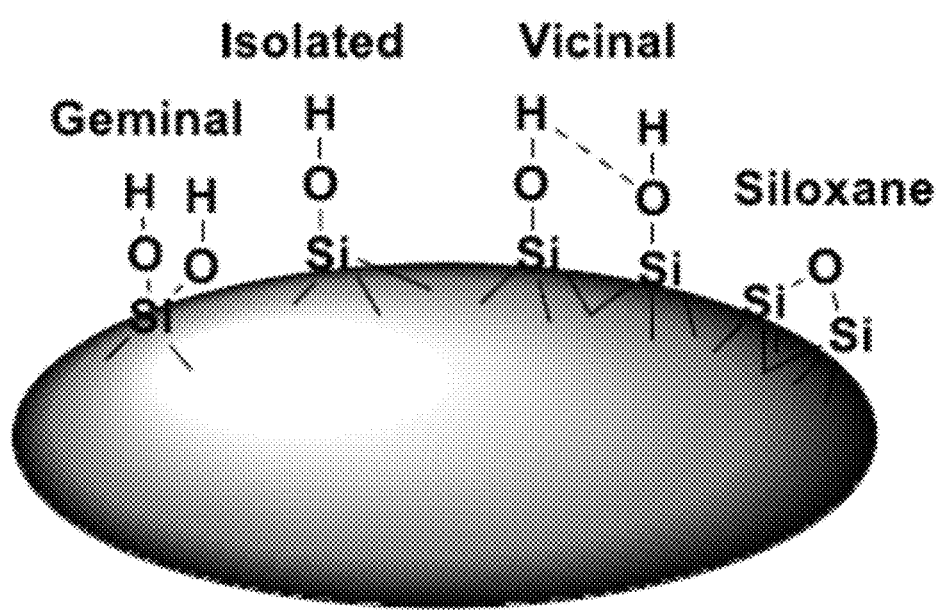
FIG. 1 is a schematic view showing different types of surface silanol (Si—OH) functional groups present on silica particles.
Figures 2A, 2B:
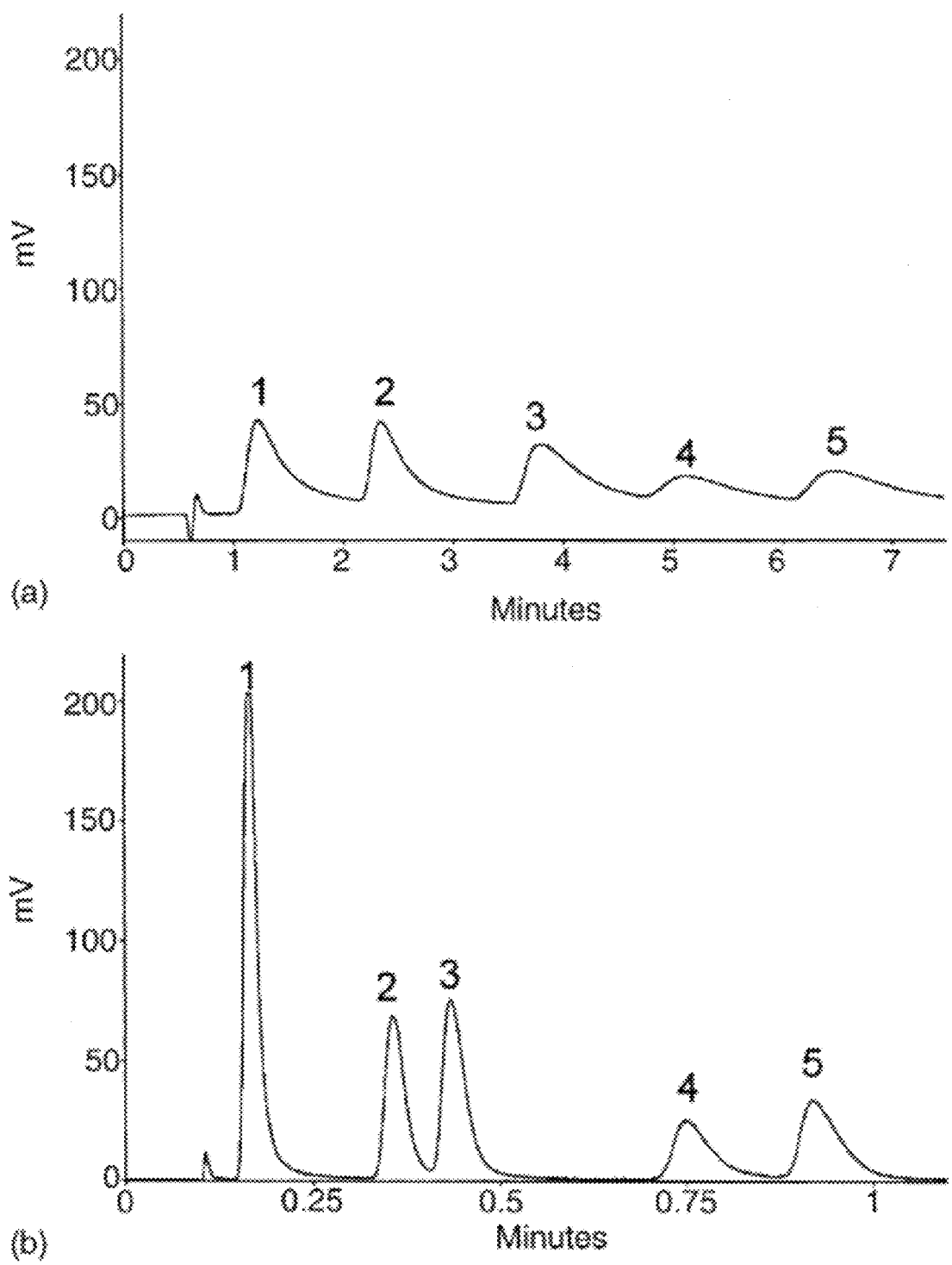
FIG. 2(a) is a chromatogram of caffeine derivatives (1. hypoxanthine; 2. theobromine; 3. theophylline; 4. Caffeine; 5. β-hydroxy-ethyl-theophylline) on a ZirChrom-DB-C18 column (50×4.6 mm id) with UV detection at 254 nm, using 60% water-40% methanol at 25° C., 1 milliliter per minute (mL/min). This figure is from Yang (Subcritical water chromatography: A green approach to high-temperature liquid chromatography, Journal of Separation Science, 30 (2007) 1131-1140)
FIG. 2(b) is a chromatogram of caffeine derivatives (1. hypoxanthine; 2. theobromine; 3. theophylline; 4. Caffeine; 5. β-hydroxy-ethyl-theophylline) on a ZirChrom-DB-C18 column (50×4.6 mm id) with UV detection at 254 nm, using water at 150° C., 7 mL/min. This figure is from Yang (supra.).

In related art LC separation, water is used mixed with organic modifier(s) (e.g., methanol, acetonitrile) as the mobile phase. The usage of organic solvent as the mobile phase modifier incurs high cost for the chromatographic separation as well as significantly high cost for waste disposal. The organic solvent usage in liquid phase separation can be substantially reduced or even eliminated if water is used at high temperature and pressure (subcritical water). If the temperature of the water is increased from 25° C. to 250° C., the polarity, surface tension and viscosity becomes identical to the aqueous-organic mobile phase (water+ccetonitrile/methanol) at room temperature. FIGS. 2(a) and 2(b) illustrates the advantage of high temperature liquid chromatography (HTLC). Using the same LC stationary phase (zirconia-C18), superior separation and substantially faster separation (in 1 min vs. 7 min) was achieved using water as the only mobile phase (FIG. 2(b)).

In an embodiment, sol-gel sorbents or LC stationary phases can be acid-catalyzed using a microcrystalline cellulose support. Preparation of acid-catalyzed microcrystalline cellulose supported sol-gel sorbents and LC stationary phases can comprise the following steps: (a1) surface cleaning and activation of cellulose particles; (b1) preparation of the sol solution; and (c1) sol-gel sorbent coating process. The process can further comprise (d1) conditioning and cleaning of sol-gel sorbent coated cellulose particles. FIGS. 4(a)-4(d) show chemical reactions that take place in the acid-catalyzed process for fabricating microcrystalline cellulose supported sol-gel sorbents and LC stationary phases. Both hydrolysis and polycondensation reactions proceed simultaneously, resulting in a thin layer of sol-gel sorbent chemically bonded to the microcrystalline cellulose particles.

Figure 3:
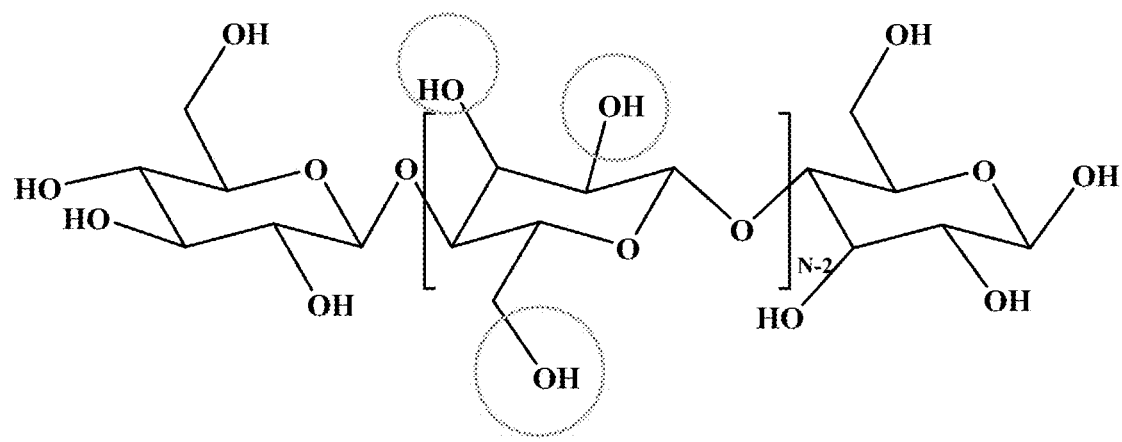
FIG. 3 is a schematic view showing the chemical structure of a cellulose substrate, demonstrating available hydroxyl functional groups for anchoring a sol-gel inorganic-organic network, according to an embodiment of the subject invention.
Figures 4A, 4B, 4C, 4D:
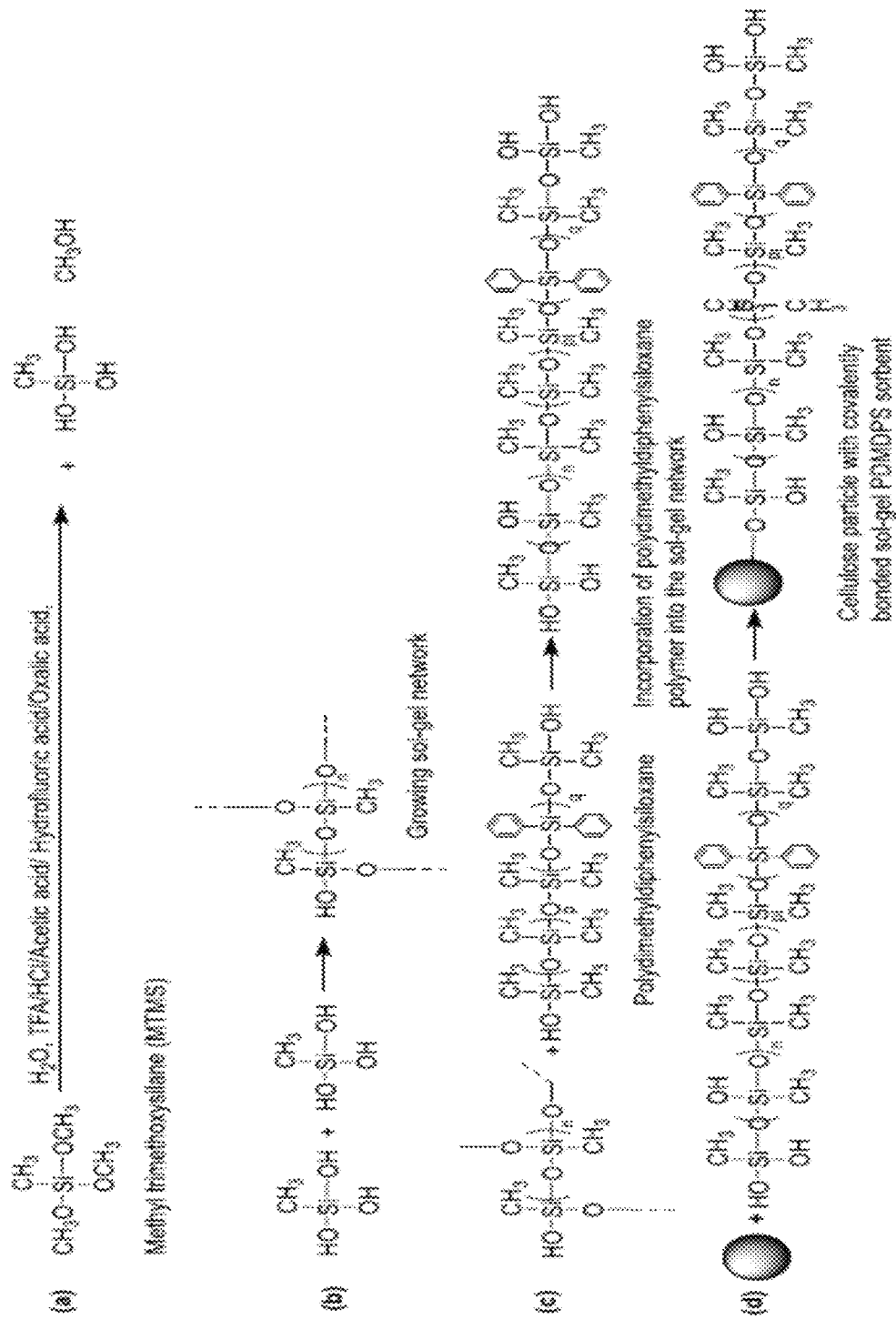
FIG. 4(a) is a chemical reaction involved in acid catalyzed sol-gel cellulose sorbents and liquid chromatographic stationary phases, according to an embodiment of the subject invention.
FIG. 4(b) is a chemical reaction involved in acid catalyzed sol-gel cellulose sorbents and liquid chromatographic stationary phases, according to an embodiment of the subject invention.
FIG. 4(c) is a chemical reaction involved in acid catalyzed sol-gel cellulose sorbents and liquid chromatographic stationary phases, according to an embodiment of the subject invention; polydimethyldiphenylsiloxane is shown here as an example.
FIG. 4(d) is a chemical reaction involved in acid catalyzed sol-gel cellulose sorbents and liquid chromatographic stationary phases, according to an embodiment of the subject invention.
Figures 5A, 5B, 5C, 5D:
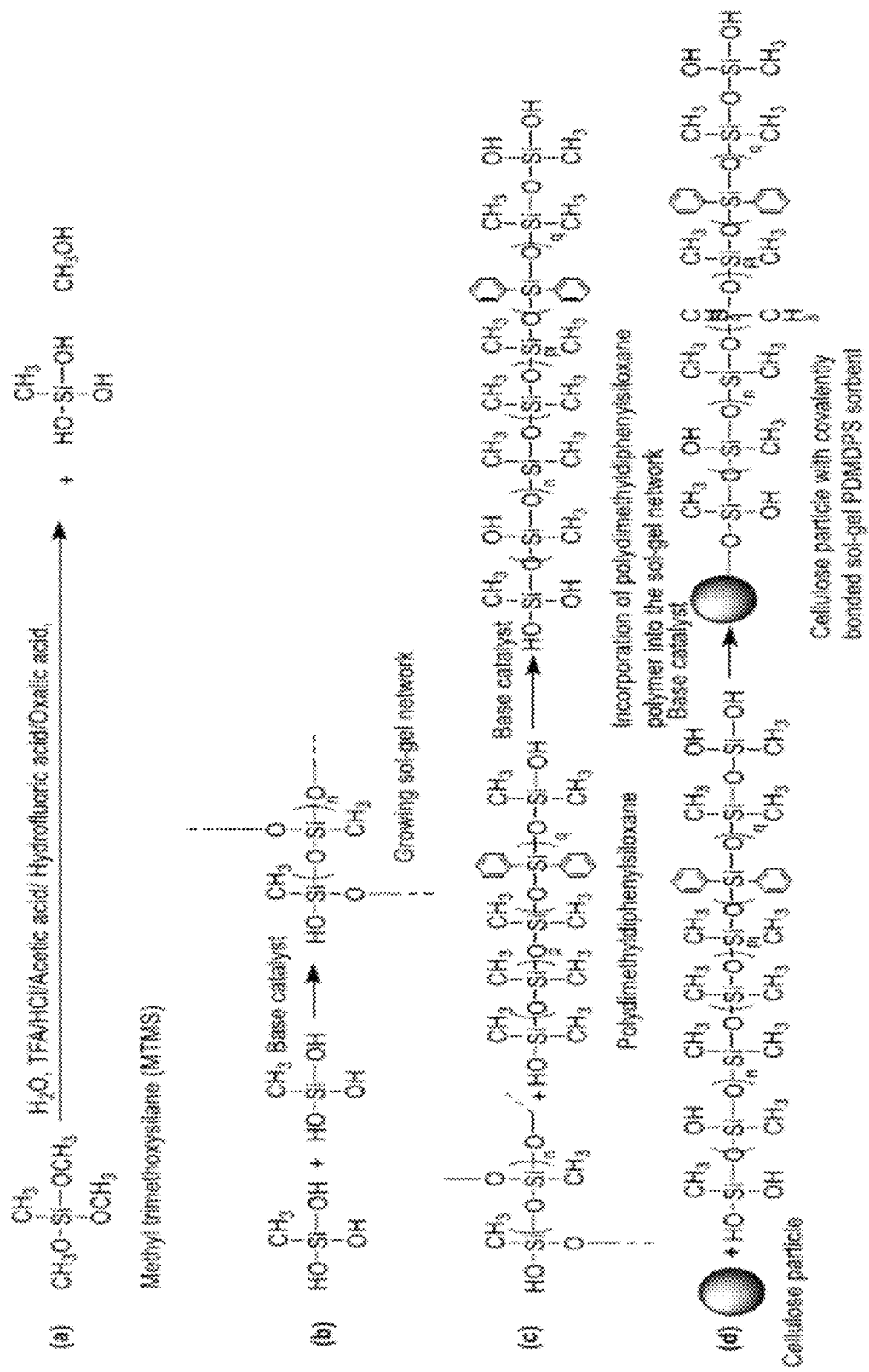
FIG. 5(a) is a chemical reaction involved in acid-base dual catalyzed sol-gel cellulose sorbents and liquid chromatographic stationary phases, according to an embodiment of the subject invention.
FIG. 5(b) is a chemical reaction involved in acid-base dual catalyzed sol-gel cellulose sorbents and liquid chromatographic stationary phases, according to an embodiment of the subject invention.
FIG. 5(c) is a chemical reaction involved in acid-base dual catalyzed sol-gel cellulose sorbents and liquid chromatographic stationary phases, according to an embodiment of the subject invention; polydimethyldiphenylsiloxane is shown here as an example.
FIG. 5(d) is a chemical reaction involved in acid-base dual catalyzed sol-gel cellulose sorbents and liquid chromatographic stationary phases, according to an embodiment of the subject invention.

The surface cleaning and activation of cellulose particles (step (a1)) will now be described in more detail. Microcrystalline cellulose particles possess abundant surface hydroxyl groups. FIG. 3 shows a schematic view of the chemical structure of cellulose, which is a hydrophilic linear polymer of β-D-glucopyranose. Referring to FIG. 3, each dimer of cellulose contains three hydroxyl functional groups in positions 2, 3, and 6 that can participate in polycondensation during the sol-gel coating process at a varying degree of reactivity. As such, microcrystalline cellulose particles serve as an excellent substrate for sol-gel sorbent coating.

The microcrystalline cellulose particles can be activated (e.g., by treatment with a solution (e.g., a basic solution such as ammonium hydroxide or a 1 M NaOH solution) under sonication). Swelling of cellulose, also known as mercerization, is an important treatment that improves its chemical reactivity and significantly increases the availability of all the hydroxyl groups for chemical reactions. The activation can also lead to mercerization. The treated microcrystalline cellulose particles can then washed (e.g., several times with deionized water), followed by treatment with a solution (e.g., an acidic solution such as 0.1 M HCl solution, trifluoroacetic acid, nitric acid, acetic acid, or formic acid) under sonication). The treated particles can then washed again (e.g., with a large amount of deionized water) and then dried (such as in a drying chamber with a flow of inert gas such as helium gas). If desired, the dried particles can be stored (e.g., in one or more airtight containers) until the coating process (step (c1)).

The preparation of the sol solution (step (b1)) will now be described in more detail. The sol solution for creating microcrystalline cellulose supported sol-gel sorbents and stationary phases can be prepared by dissolving a polymer (e.g., octadecyl trimethoxysilane, polydimethyldiphenylsiloxane, polyethylene glycol, polytetrahydrofuran, or any ligand connected to bialkoxysilane or trialkoxysilane or an organic/organic-inorganic polymer with a hydroxyl terminal group), a cross-linker (e.g., methyltrimethoxysilane (MTMS), ethyl trimethoxysilane, or propyl trimethoxy silane), at least one solvent (e.g., an organic solvent such as methylene chloride: acetone (50:50 v/v), methanol, tetrahydrofuran, propanol, or ethanol), and a sol-gel catalyst (e.g., trifluoroacetic acid (5% water), formic acid, HCl, acetic acid, or oxalic acid). The mixture can be vortexed and/or centrifuged, and the clear supernatant of the sol solution can then be transferred to a container (e.g., a reaction bottle). Non-limiting examples of the polymer (precursor) that can be used are shown in FIGS. 29(a)-29(d)-(p-methyl phenyl) methyldimethoxysilane (an example of a bi-alkoxy silane), 3,4-methylenedioxyphenyltriethoxysilane (an example of a trialkoxy silane), hydroxyterminated poly(dimethyl siloxane) (an example of a bihydroxy terminated polymer), and monohydroxyterminated poly(dimethylsiloxane).

The sol-gel sorbent coating process (step (c1)) will now be described in more detail. Chemically treated microcrystalline cellulose particles were used as the substrate (see step (a1)). The microcrystalline cellulose particles can be gently inserted into the container having the sol solution so that a three-dimensional network of sol-gel sorbents can be formed on the surface of the substrate as well as throughout the porous matrix. The microcrystalline cellulose particles can be kept inside the sol solution for a period of time (e.g., 24 hours). The sol-gel sorbent coating process can be carried out at a temperature above room temperature (e.g., inside an oven at 50° C. or more).

The conditioning and cleaning of sol-gel sorbent coated cellulose particles (step (d1)) will now be described in detail. After completing the coating, the sol solution can be removed from the container and the sol-gel sorbent coated microcrystalline cellulose particles can be dried and aged (e.g., in a conditioning device inside a gas chromatography oven), optionally with continuous flow of inert gas (e.g., helium gas flow at 50° C. or more). Before using for extraction, the sol-gel sorbents coated microcrystalline cellulose particles can be rinsed (e.g., sequentially with two different solvents) followed by drying (e.g., at 50° C. under an inert atmosphere). If desired, they can be stored in a closed container to inhibit contamination.

In an embodiment, sol-gel sorbents or LC stationary phases can be acid-base dual catalyzed using a microcrystalline cellulose support. Preparation of acid-base dual catalyzed microcrystalline cellulose supported sol-gel sorbents and LC stationary phases can comprise the following steps: (a2) surface cleaning and activation of cellulose particles; (b2) preparation of the sol solution; and (c2) sol-gel sorbent coating process. The process can further comprise (d2) conditioning and cleaning of sol-gel sorbent coated cellulose particles. FIGS. 5(a)-5(d) show chemical reactions that take place in the acid-base dual catalyzed process for fabricating microcrystalline cellulose supported sol-gel sorbents and LC stationary phases. The sol-gel reactions are carried out in two steps: (1) hydrolysis (e.g., hydrolysis of tetramethylorthosilicate (TMOS)) under acid catalyst; and (b) polycondensation under basic catalyst. A solid gel is formed during polycondensation with the encapsulated and chemically bonded microcrystalline cellulose particles into its core.

The surface cleaning and activation of cellulose particles (step (a2)) is the same as for step (a1) described above. The preparation of the sol solution (step (b2)) will now be described in more detail. The sol solution for creating microcrystalline cellulose supported sol-gel sorbents and stationary phases can be prepared by dissolving a polymer (e.g., octadecyl trimethoxysilane, polydimethyldiphenylsiloxane, polyethylene glycol, polytetrahydrofuran, or any ligand connected to bialkoxysilane or trialkoxysilane or an organic/organic-inorganic polymer with a hydroxyl terminal group), a cross-linker (e.g., TMOS, MTMS, ethyl trimethoxysilane (ETMOS), or propyl trimethoxy silane (PTMOS)), at least one solvent (e.g., an organic solvent such as 2-propanol, methanol, tetrahydrofuran, propanol, ethanol, or a mixture such as methylene chloride and acetone (50:50 v/v)), and a sol-gel catalyst (e.g., HCl (0.1 M), formic acid, trifluoroacetic acid, acetic acid, or oxalic acid). The mixture can be vortexed and/or centrifuged, and the clear supernatant of the sol solution can then be transferred to a container (e.g., a reaction bottle). The mixture can then be heated for hydrolysis of the sol-gel precursor(s) (e.g., heated in an oven at 50° C. or more for several hours). Non-limiting examples of the polymer (precursor) that can be used are shown in FIGS. 29(a)-29(d)-(p-methyl phenyl) methyldimethoxysilane (an example of a bi-alkoxy silane), 3,4-methylenedioxyphenyltriethoxysilane (an example of a trialkoxy silane), hydroxyterminated poly(dimethyl siloxane) (an example of a bihydroxy terminated polymer), and monohydroxyterminated poly(dimethylsiloxane).

The sol-gel sorbent coating process (step (c2)) will now be described in more detail. Chemically treated microcrystalline cellulose particles were used as the substrate (see step (a1/a2)). The microcrystalline cellulose particles can be gently inserted into the container having the sol solution under magnetic stirring so that the microcrystalline cellulose particles remain homogeneously dispersed into the sol solution. Subsequently, a base solution (e.g., (1 M NH$_4$OH, 0.1 M NH$_4$F, NaOH, or 3-aminopropyl trimethoxysilane) can be added to the sol solution (e.g., added in droplets under vigorous stirring). The sol solution slowly becomes viscous and forms a solid mass after a period of time (e.g., an hour or about an hour). The solid mass can be heated (e.g., heated in an oven at 50° C. or more for several (e.g., 24) hours).

The conditioning and cleaning of sol-gel sorbent coated cellulose particles (step (d2)) will now be described in detail. After completing the conditioning of sol-gel sorbent coated microcrystalline particles, the solid mass can be crushed into small pieces and subsequently cleaned (e.g., in a Soxhlet extraction system using a solvent such as methanol:methylene chloride (50:50 v/v) for a period of time such as several hours (e.g., 6 hours)). The cleaned mass can be dried (e.g., in a vacuum at 80° C. or more for several hours).

Figure 6:
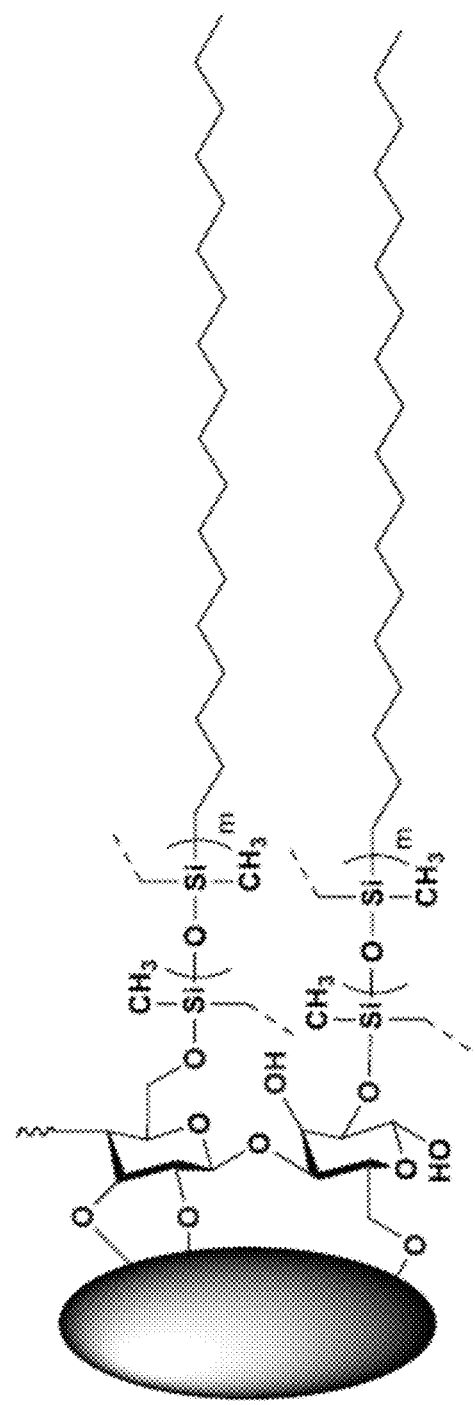
FIG. 6 is a schematic view of sol-gel C18 coated cellulose particles, according to an embodiment of the subject invention.
Figure 7:
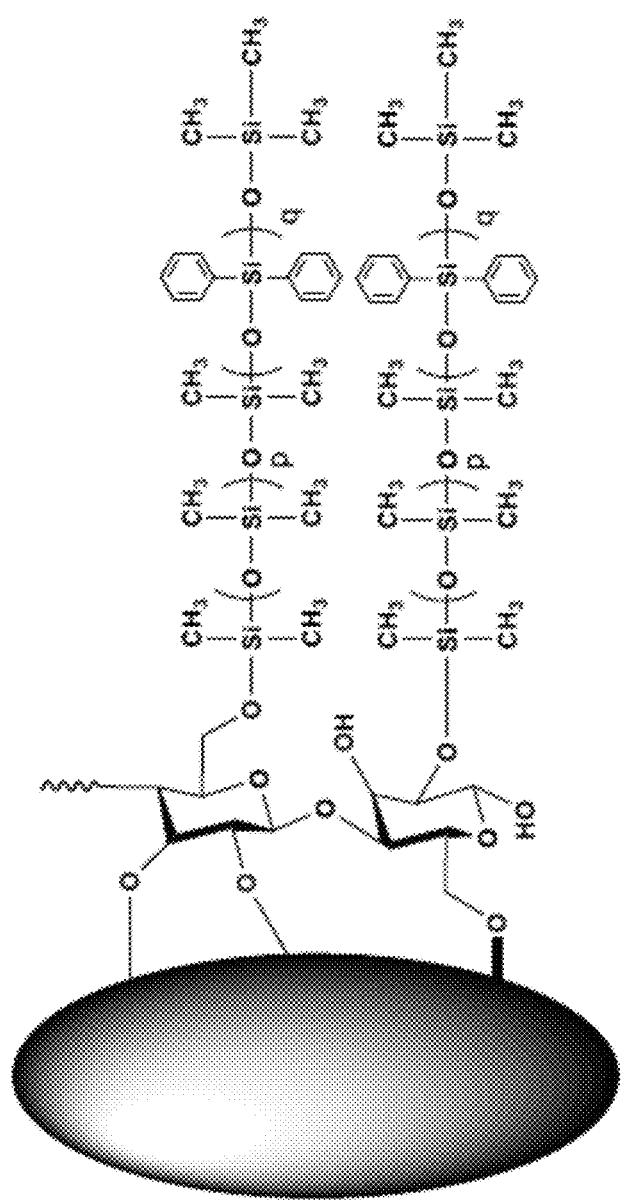
FIG. 7 is a schematic view of sol-gel poly(dimethyldiphenylsiloxane) coated cellulose particles, according to an embodiment of the subject invention.
Figure 8:
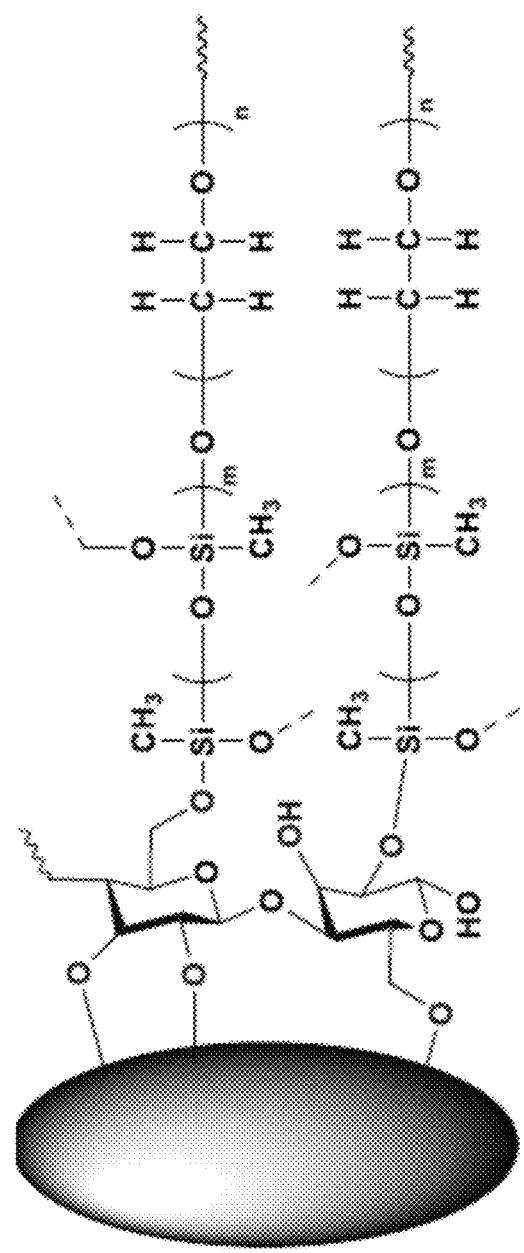
FIG. 8 is a schematic view of sol-gel poly(ethylene glycol) coated cellulose particles, according to an embodiment of the subject invention.
Figure 9:
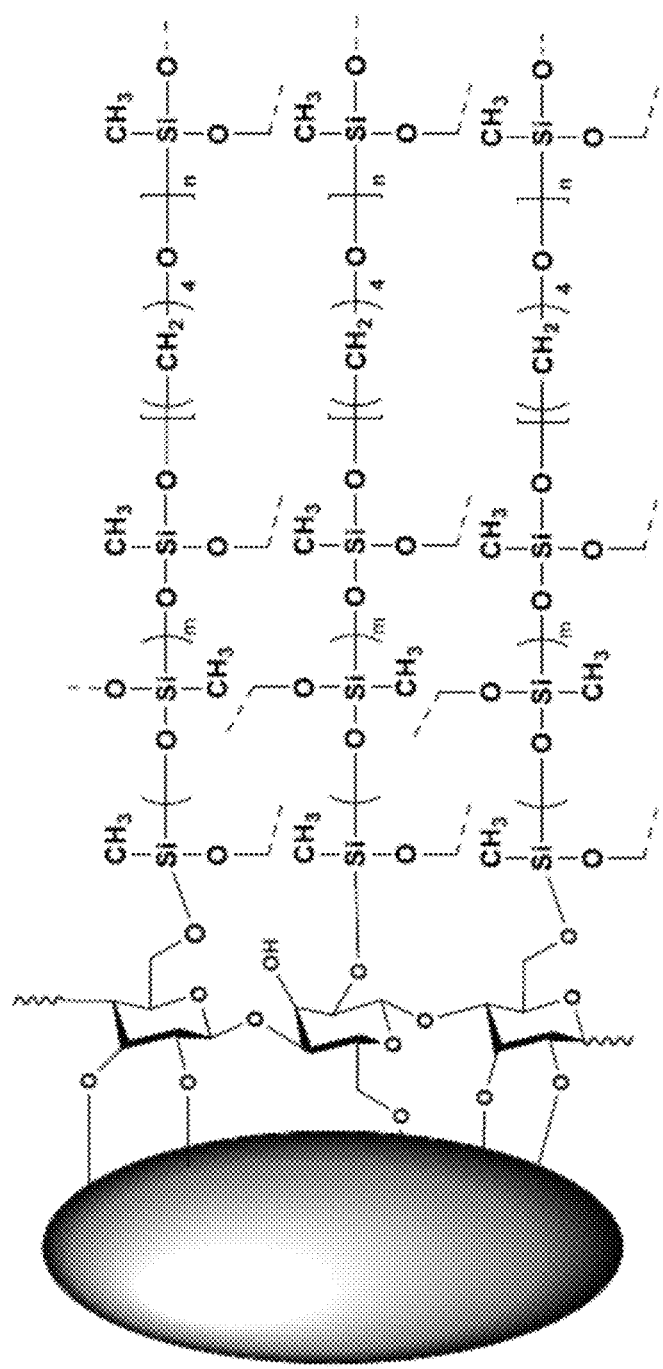
FIG. 9 is a schematic view of sol-gel poly(tetrahydrofuran) coated cellulose particles, according to an embodiment of the subject invention.
Figure 10:
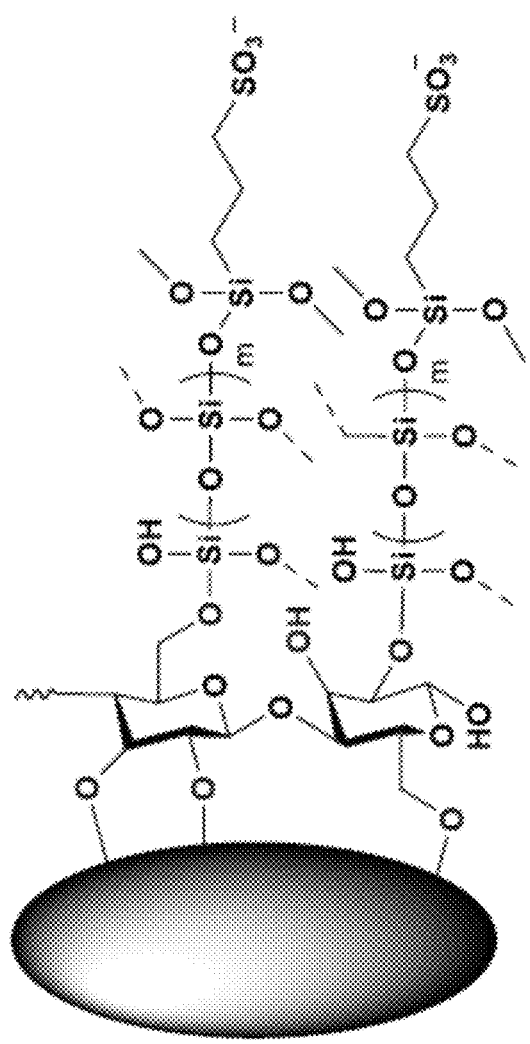
FIG. 10 is a schematic view of sol-gel cation exchanging sorbent coated on cellulose particles, according to an embodiment of the subject invention.
Figure 11:
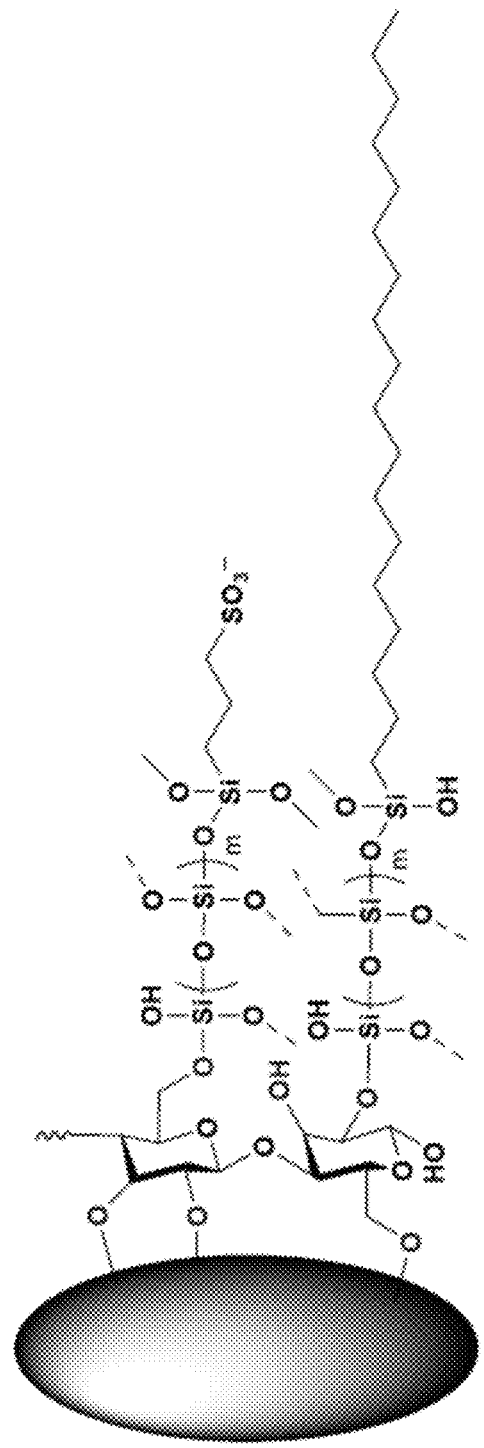
FIG. 11 is a schematic view of sol-gel mixed mode sorbent coated on cellulose particles (neutral and cation exchanging), according to an embodiment of the subject invention.
Figure 12:
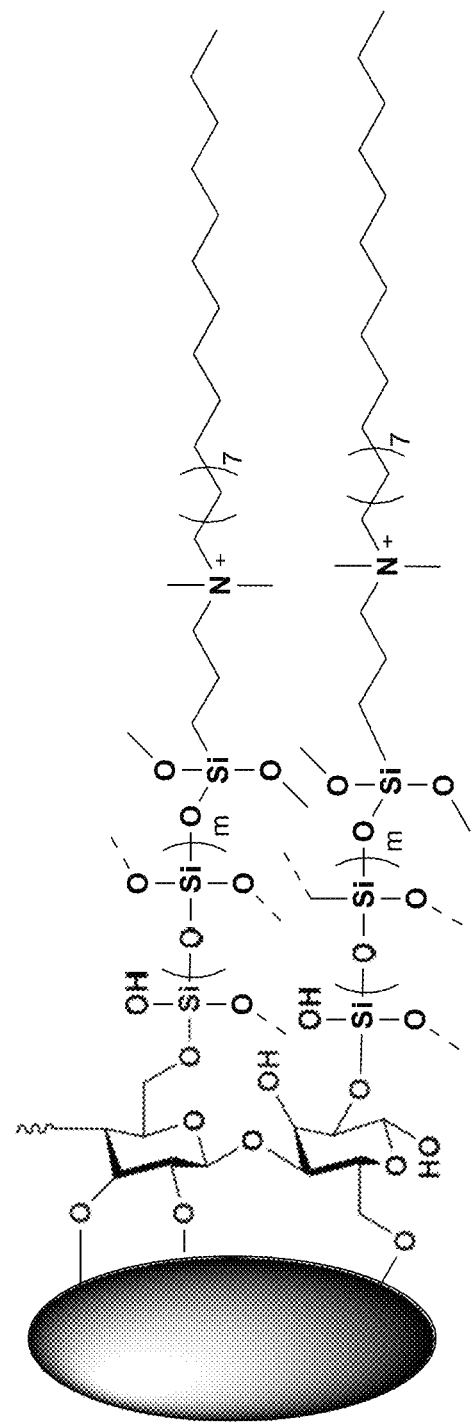
FIG. 12 is a schematic view of sol-gel anion exchanging sorbent coated on cellulose particles, according to an embodiment of the subject invention.
Figure 13:
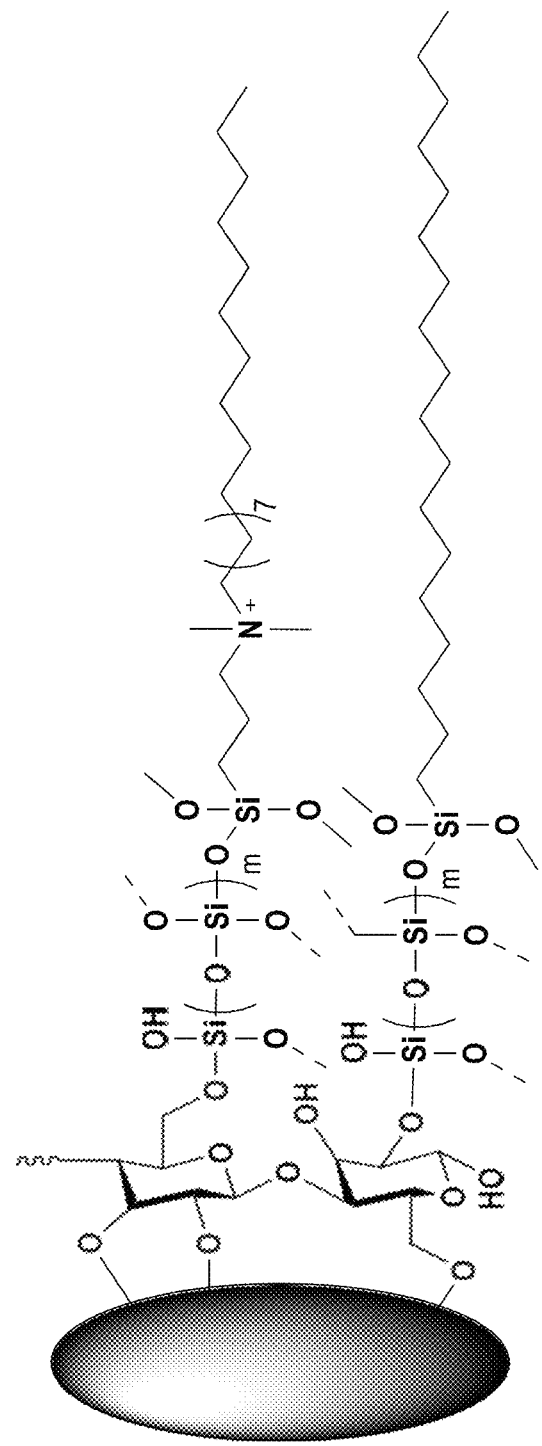
FIG. 13 is a schematic view of sol-gel mixed mode sorbent coated on cellulose particles (neutral and anion exchanging), according to an embodiment of the subject invention.

FIGS. 6-13 show schematic views of acid-catalyzed and acid-base dual catalyzed sol-gel sorbents on microcrystalline cellulose particles, according to embodiments of the subject invention. FIG. 6 shows sol-gel C18 coated cellulose particles; FIG. 7 shows sol-gel poly(dimethyldiphenylsiloxane) coated cellulose particles; FIG. 8 shows sol-gel poly(ethylene glycol) coated cellulose particles; FIG. 9 shows sol-gel poly(tetrahydrofuran) coated cellulose particles; FIG. 10 shows sol-gel cation exchanging sorbent coated on cellulose particles; FIG. 11 shows sol-gel mixed mode sorbent coated on cellulose particles (neutral and cation exchanging); FIG. 12 shows sol-gel anion exchanging sorbent coated on cellulose particles; and FIG. 13 shows sol-gel mixed mode sorbent coated on cellulose particles (neutral and anion exchanging).

Embodiments of the subject invention provide several advantages over related SPE sorbents and LC stationary phases and methods of fabricating the same. For example, the fabrication methods of embodiments of the subject invention are simpler than related art multistep synthesis processes. Also, replacement of silica with microcrystalline cellulose particles eliminates the problems related to residual surface silanol (Si—OH) groups that pose a great challenge to the separation and analysis of organic bases (about 70% of pharmaceutical products are organic bases). Embodiments of the subject invention also substantially expand the working pH range (1-13) and temperature range (up to 350° C. or even higher) in which the SPE sorbents and LC stationary phases are stable. Embodiments of the subject invention provide equivalent or better separation for polar, nonpolar, and medium polar compounds, when compared to related art silica-based SPE sorbents and LC stationary phases. New extraction sorbents and LC stationary phases are provided, and the extraordinarily high thermal stability of the new LC stationary phases make HTLC more feasible, which lead to the application of subcritical water as the mobile phase and the elimination of toxic and hazardous organic solvents in the mobile phase. Embodiments of the subject invention therefore mark a milestone in green analytical chemistry. SPE sorbents of embodiments of the subject invention can empower wastewater treatment plants (WWTP) to be able to remove persistent and emerging pollutants more effectively, and embodiments can also substantially reduce the production costs of SPE sorbents and LC stationary phases.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

EXAMPLE 1

Acid-Catalyzed Sol-Gel Sorbents and LC Stationary Phases

Acid-catalyzed microcrystalline cellulose supported sol-gel sorbents and LC stationary phases were prepared. The microcrystalline cellulose particles were activated by treating them with 1 M NaOH solution for 1 hour under sonication. The base-treated microcrystalline cellulose particles were then washed several times with deionized water, followed by treating with 0.1 M HCl solution for 1 hour under sonication. The treated particles were then washed with a large amount of deionized water and then dried in a home-made drying chamber with continuous helium gas flow at 50° C. overnight. The dried particles were stored in a clean airtight glass container until the step of coating with sol-gel sorbents.

The sol solution for creating microcrystalline cellulose supported sol-gel sorbents and LC stationary phases was prepared by dissolving 10 g of polymer (octadecyl trimethoxysilane, polydimethyldiphenylsiloxane, polyethylene glycol, and polytetrahydrofuran, respectively, for different sorbents/stationary phases), 10.0 mL of methyltrimethoxysilane (MTMS), 20 mL of methylene chloride: acetone (50:50 v/v) as the organic solvent, and 4 mL of trifluoroacetic acid (5% water) as the sol-gel catalyst. The mixture was then vortexed for 3 minutes, centrifuged for 5 minutes, and finally the clear supernatant of the sol solution was transferred to a clean 60 mL amber-colored glass reaction bottle.

The chemically treated microcrystalline cellulose particles were used as the substrate for the sol-gel sorbent coatings. 5.0 g of the clean and treated microcrystalline cellulose particles were gently inserted into the reaction bottle containing the sol solution so that a three-dimensional network of sol-gel sorbents could be formed on the surface of the substrate as well as throughout the porous matrix. The microcrystalline cellulose particles were kept inside the sol solution for 24 hours. The sol-gel sorbent coating process was carried out inside an oven at 50° C.

After completing the coating period, the sol solution was expelled from the reaction bottle and the sol-gel sorbent coated microcrystalline cellulose particles were dried and aged in a home-made conditioning device built inside a gas chromatography oven with continuous helium gas flow at 50° C. for 24 h. Before using for extraction, the sol-gel sorbents coated microcrystalline cellulose particles were rinsed sequentially with methylene chloride and methanol followed by drying at 50° C. under an inert atmosphere for 1 hour and stored in a closed glass container to inhibit contamination.

Figure 28:
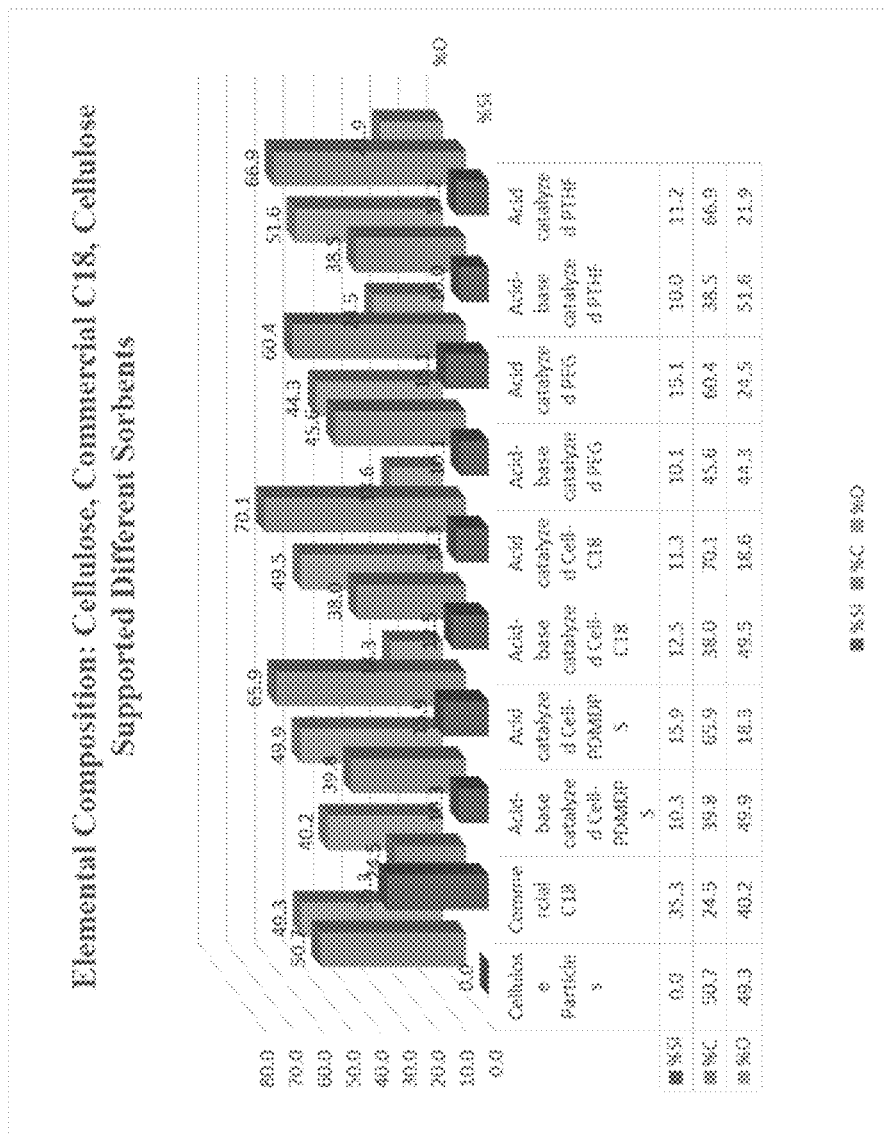
Figure 29A:
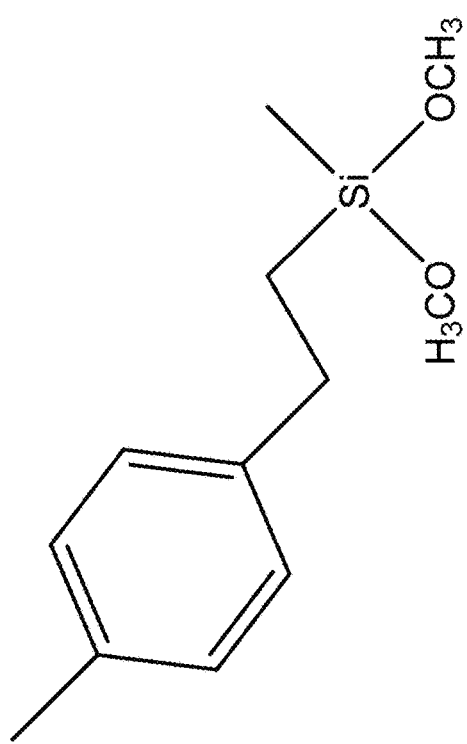
FIG. 29(a) shows the chemical structure for (p-methyl phenyl) methyldimethoxysilane, a bi-alkoxy silane.
Figure 29B:
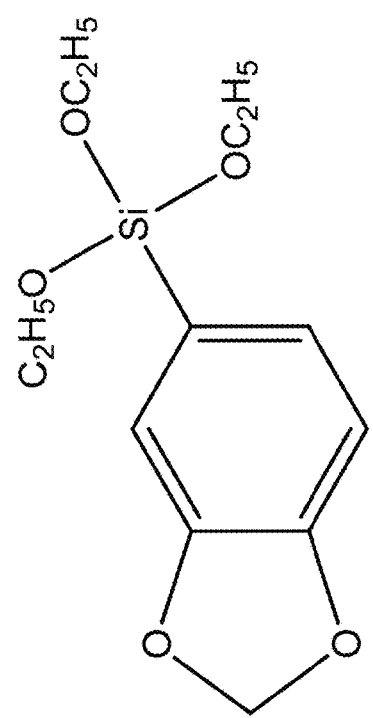
FIG. 29(b) shows the chemical structure for 3,4-methylenedioxyphenyltriethoxysilane, a trialkoxy silane.
Figure 29C:
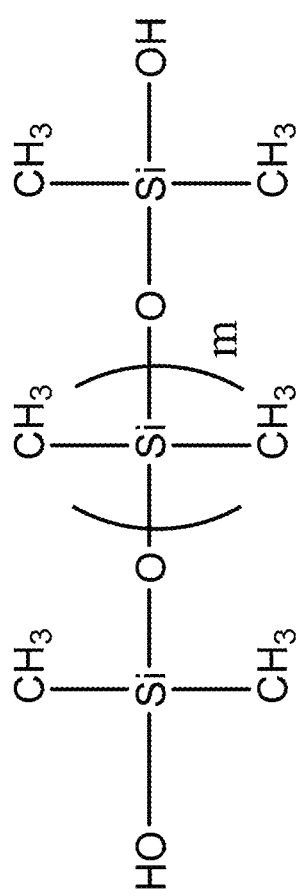
FIG. 29(c) shows the chemical structure for hydroxyterminated poly(dimethyl siloxane), a bihydroxy terminated polymer.
Figure 29D:
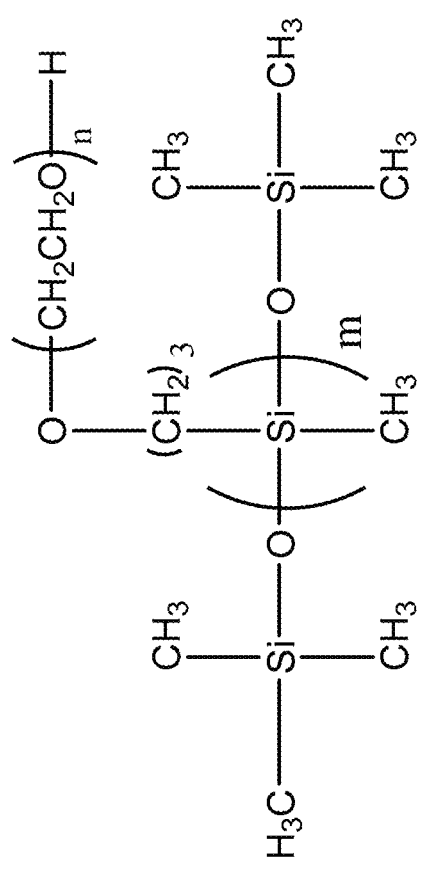
FIG. 29(d) shows the chemical structure for monohydroxyterminated poly(dimethylsiloxane).

The result was acid-catalyzed sol-gel C18 coated cellulose particles, sol-gel poly(dimethyldiphenylsiloxane) coated cellulose particles, sol-gel poly(ethylene glycol) coated cellulose particles, and sol-gel poly(tetrahydrofuran) coated cellulose particles. FIG. 28 shows the elemental composition for these sorbent coated cellulose particles, as well as those for Example 2, standard cellulose particles, and commercial C18 (a carbon chain with 18 carbons).

EXAMPLE 2

Acid-Base Dual Catalyzed Sol-Gel Sorbents and LC Stationary Phases

Acid-base dual catalyzed microcrystalline cellulose supported sol-gel sorbents and LC stationary phases were prepared. The microcrystalline cellulose particles were activated by treating them with 1 M NaOH solution for 1 hour under sonication. The base-treated microcrystalline cellulose particles were then washed several times with deionized water, followed by treating with 0.1 M HCl solution for 1 hour under sonication. The treated particles were then washed with a large amount of deionized water and then dried in a home-made drying chamber with continuous helium gas flow at 50° C. overnight. The dried particles were stored in a clean airtight glass container until the step of coating with sol-gel sorbents.

The sol solution for creating microcrystalline cellulose supported sol-gel sorbents and LC stationary phases was prepared by dissolving 1.2 g of polymer (octadecyl trimethoxysilane, polydimethyldiphenylsiloxane, polyethylene glycol, and polytetrahydrofuran, respectively, for different sorbents/stationary phases), 4.0 mL of tetramethyl orthosilicate (TMOS), 30 mL of 2-propanol as the organic solvent, and 1.880 mL of HCl (0.1 M) as the sol-gel catalyst. The mixture was then vortexed for 3 minutes, centrifuged for 5 minutes, and finally the clear supernatant of the sol solution was transferred to a wide mouthed glass reaction bottle and kept inside an oven at 50° C. overnight for hydrolysis of the sol-gel precursor(s). The chemically treated microcrystalline cellulose particles were used as the substrate for the sol-gel sorbent coatings. 4.0 g of the clean and treated microcrystalline cellulose particles were gently inserted into the reaction bottle containing the sol solution under continuous magnetic stirring so that the microcrystalline cellulose particles remain homogeneously dispersed into the sol solution. Subsequently, 1 mL of a base solution (1 M $NH_4OH$, 0.1 M $NH_4F$) was added to the sol solution in droplets under vigorous stirring. The sol solution slowly became viscous and formed a solid mass in an hour. The solid mass was kept inside the oven at 50° C. for 24 hours.

After completing the conditioning of sol-gel sorbent coated microcrystalline particles, the solid mass was crushed into small pieces and subsequently cleaned in a Soxhlet extraction system using methanol: methylene chloride (50: 50 v/v) for 6 hours. The cleaned mass was then dried in a vacuum oven overnight at 80° C.

The result was acid-base dual catalyzed sol-gel C18 coated cellulose particles, sol-gel poly(dimethyldiphenylsiloxane) coated cellulose particles, sol-gel poly(ethylene glycol) coated cellulose particles, and sol-gel poly(tetrahydrofuran) coated cellulose particles. FIG. 28 shows the elemental composition for these sorbent coated cellulose particles, as well as those for Example 1, standard cellulose particles, and commercial C18 (a carbon chain with 18 carbons).

EXAMPLE 3

Study of pH Stability

A study of pH Stability of the acid-catalyzed sorbent coated cellulose particles and the acid-base dual catalyzed sol-gel sorbent coated cellulose particles was performed, where the sol-gel sorbent coated cellulose particles were exposed to (a) pH 1 solution for 12 hours at room temperature, and (b) pH 13 solution for at room temperature for 12 hours. In each case, subsequently, the cellulose particles were rinsed with a large amount of deionized water several times. The particles were then dried in a vacuum oven at 80° C. for 24 hours. The treated particles were then stored in air-tight plastic containers until their application.

Figure 15:
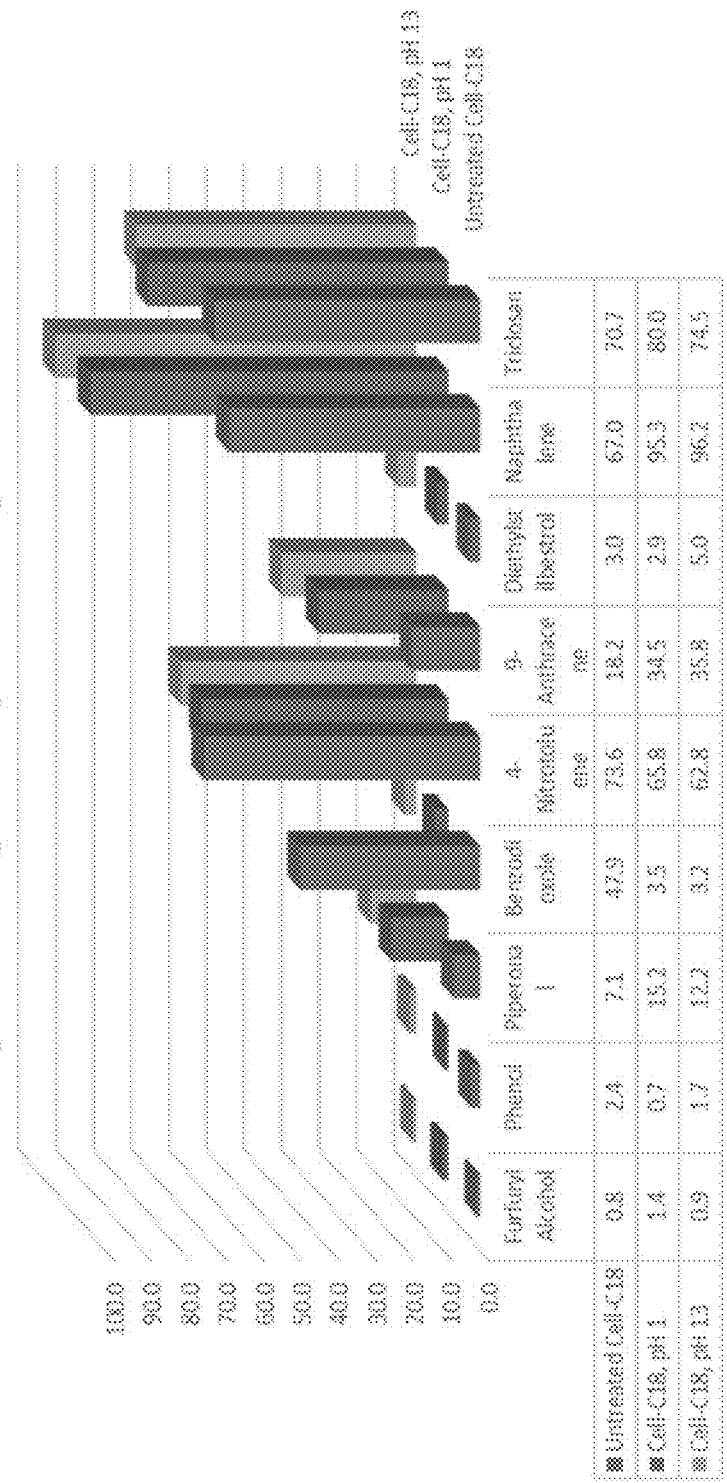
FIG. 15 is a bar chart showing a comparison of pH stability between sol-gel cellulose C18, sol-gel cellulose C18 after exposing to pH 1 for 24 hours, and sol-gel cellulose C18 after exposing to pH 13 for 24 hours. The data in the rows shown under the x-axis are represented respectively in the bar chart, where the first row is the front bar for each sorbent, the second row is the second bar from the front for each sorbent, and so on. It is noted that commercial C18 were found totally dissolved when exposed to pH 13 for 12 hours and substantially dissolved when exposed to pH 1 for 12 hours.
Figure 16:
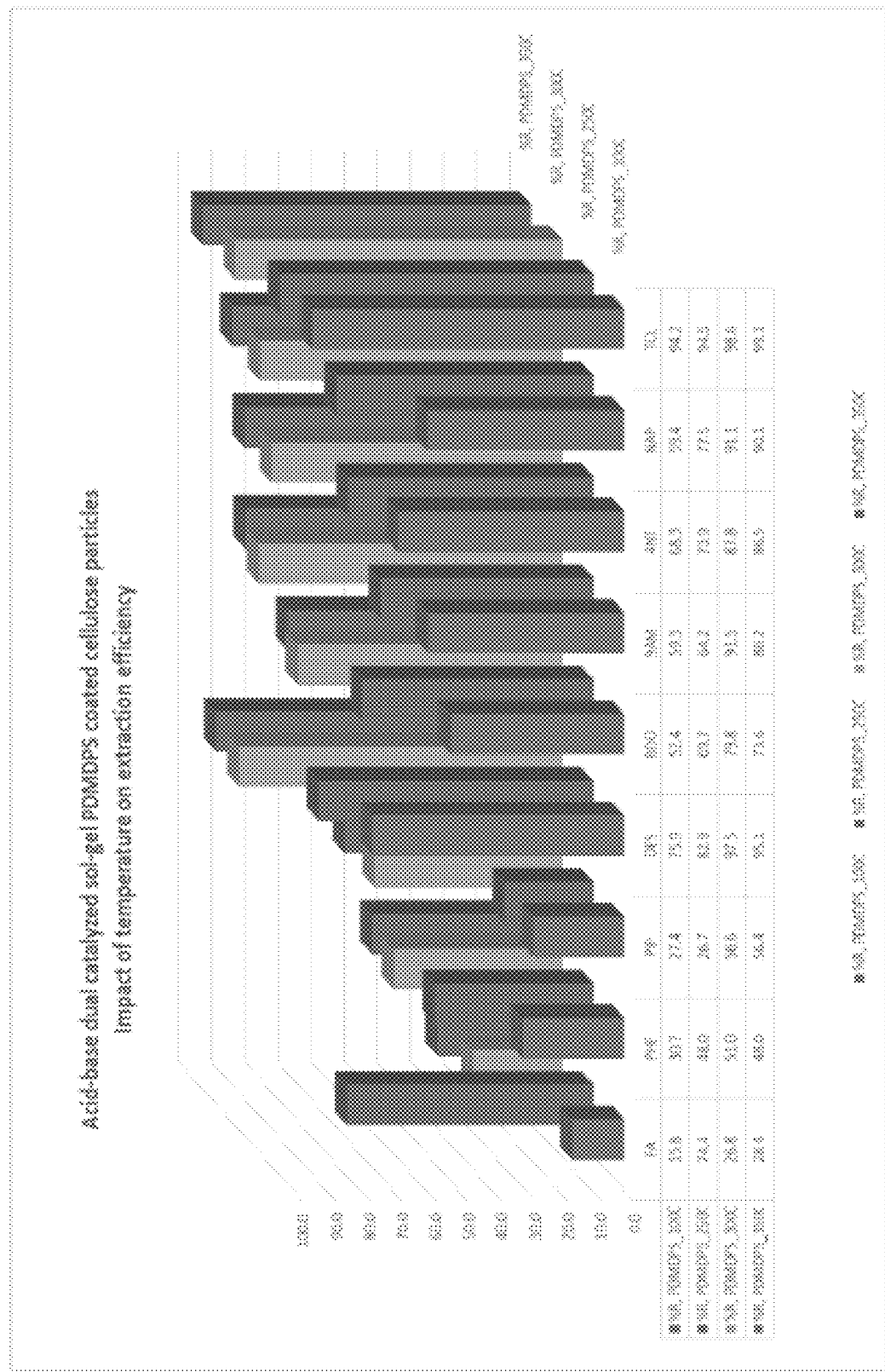
Figure 17:
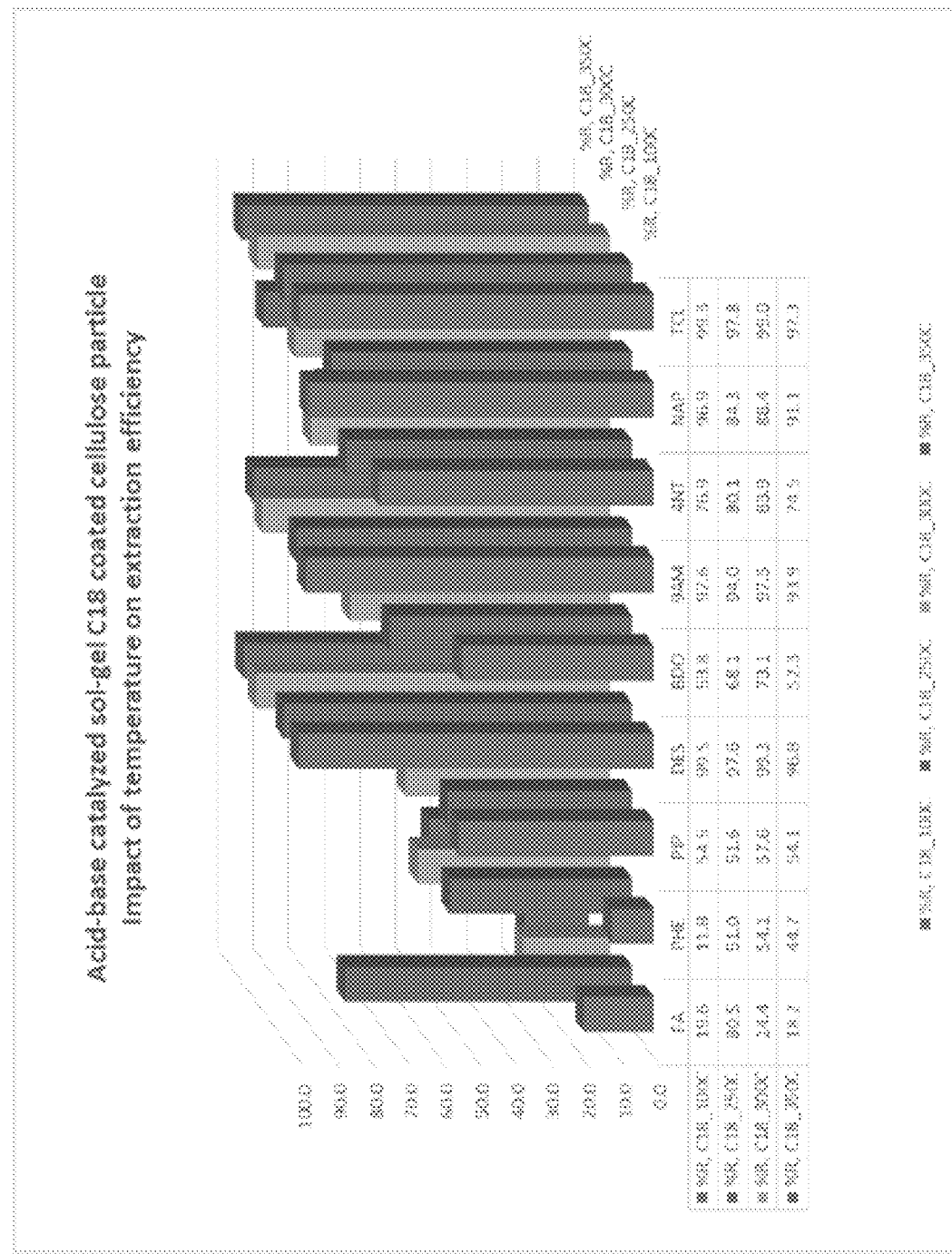
Figure 18:
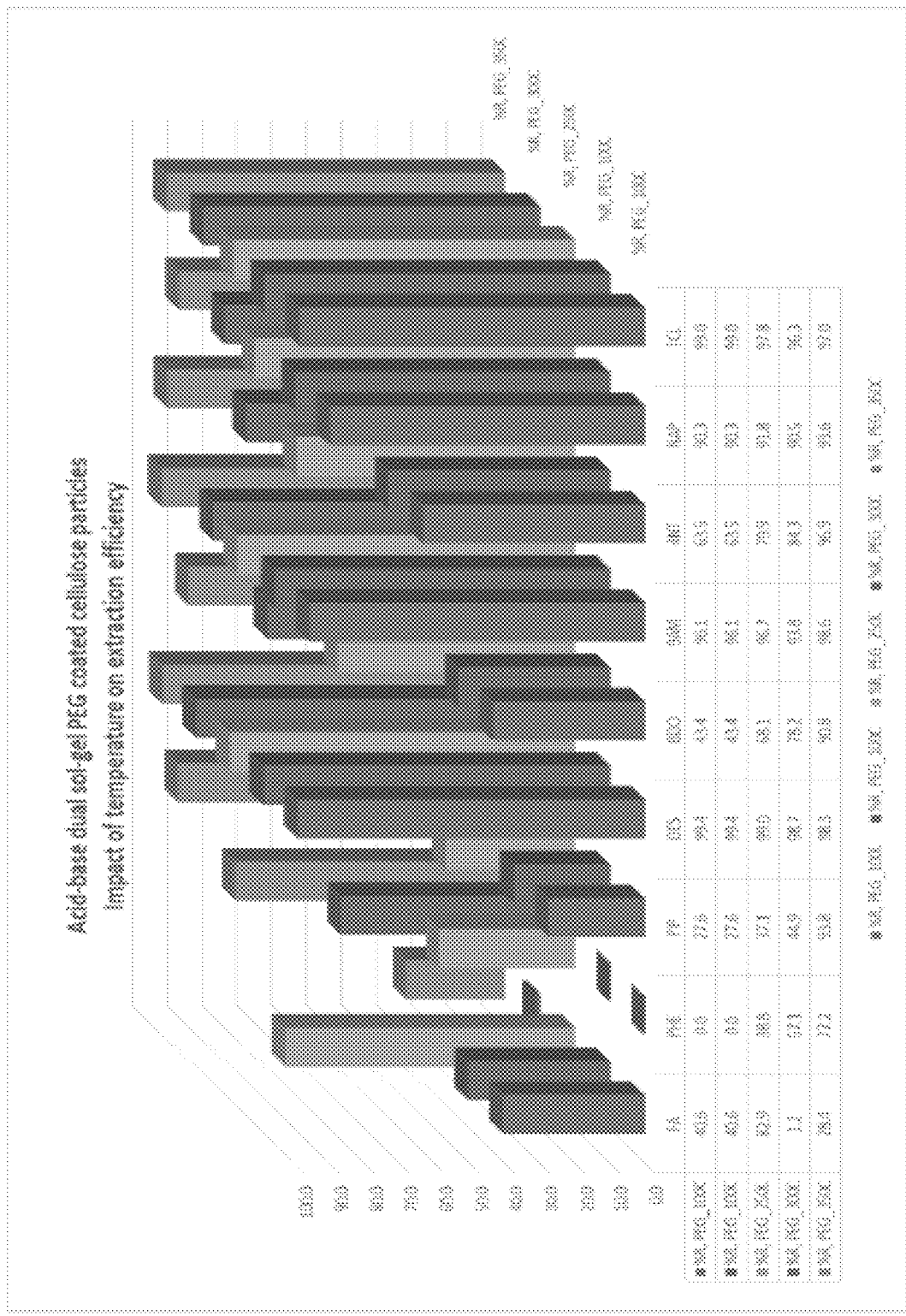
Figure 19:
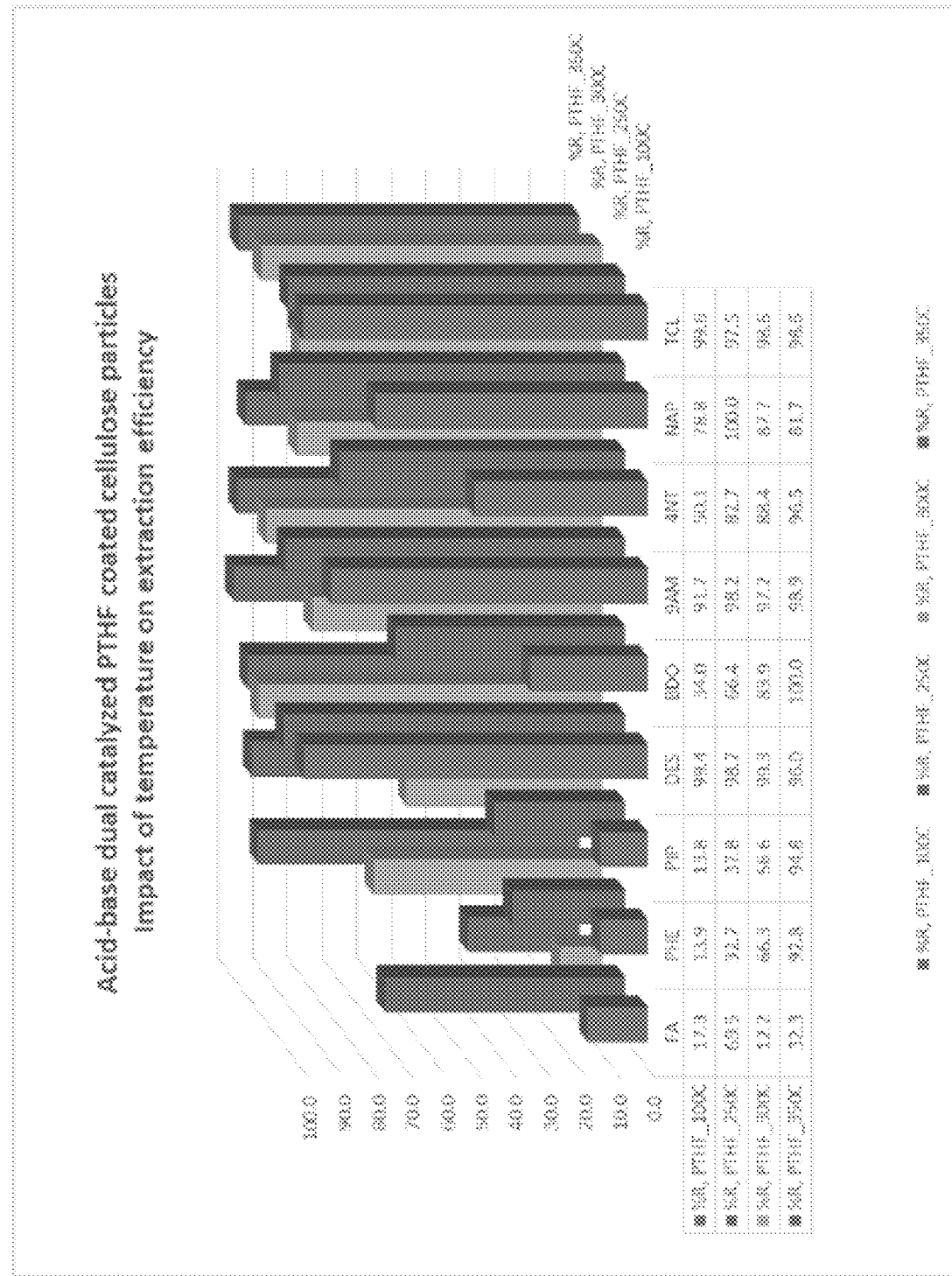
Figure 20:
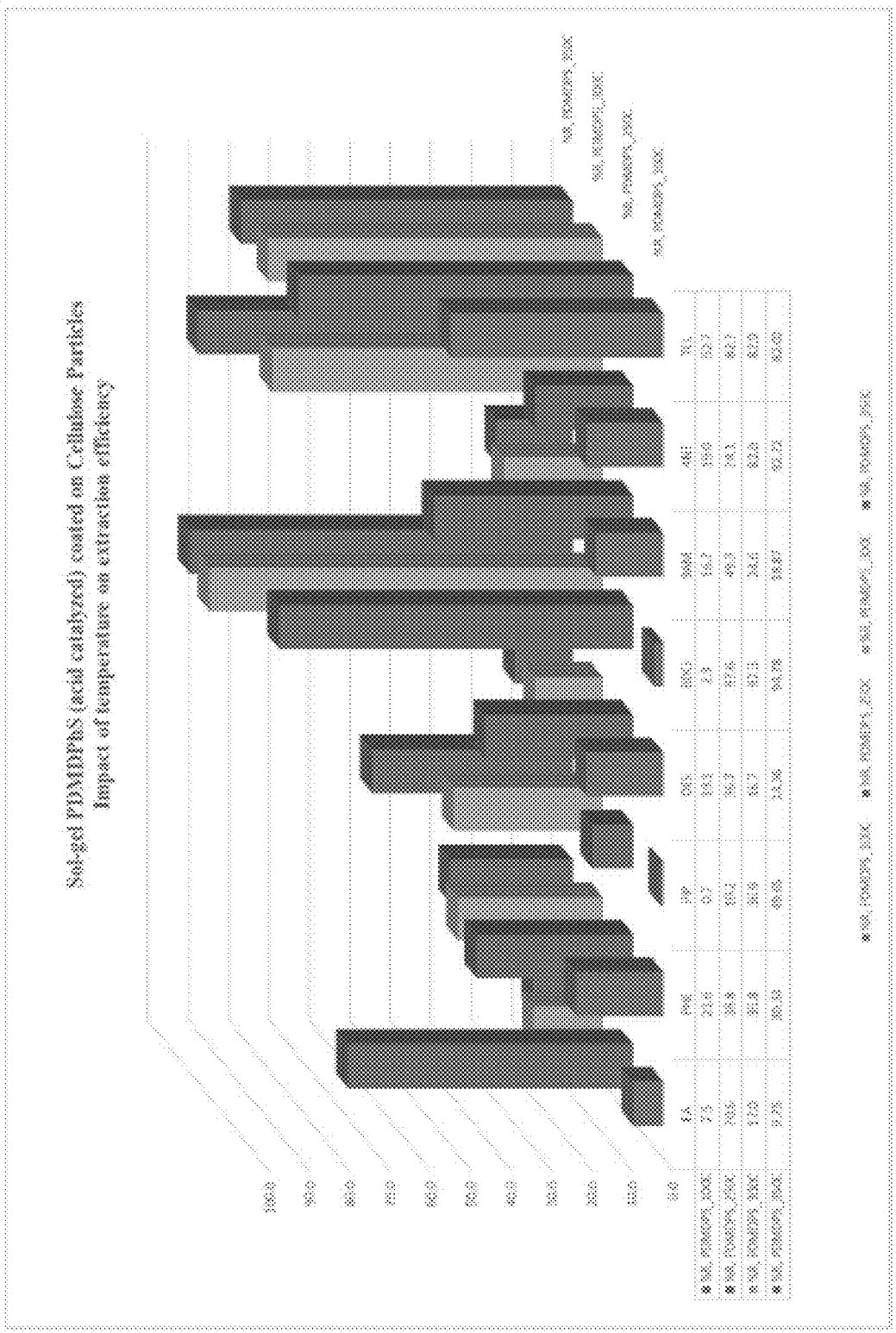
Figure 21:
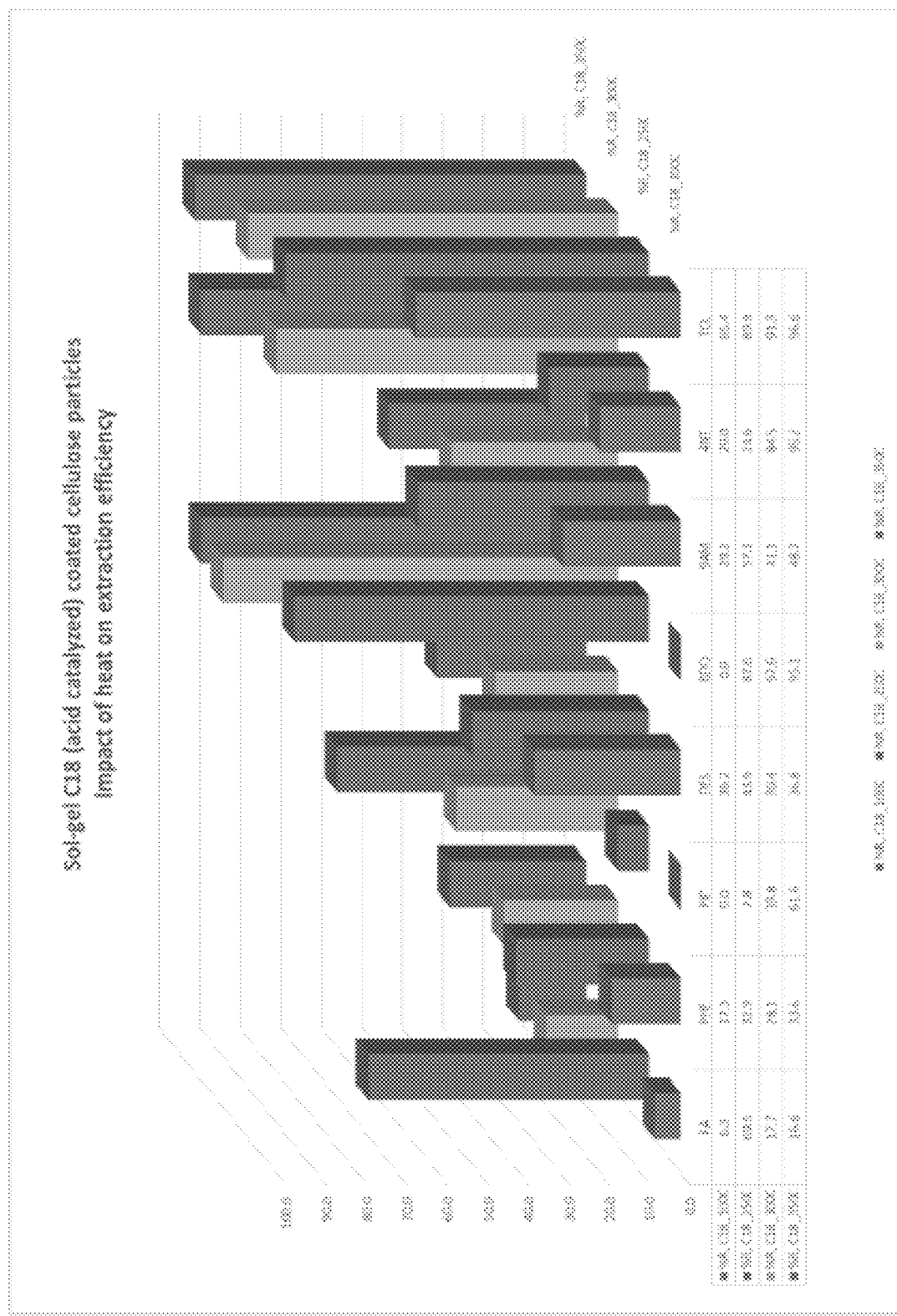
Figure 22:
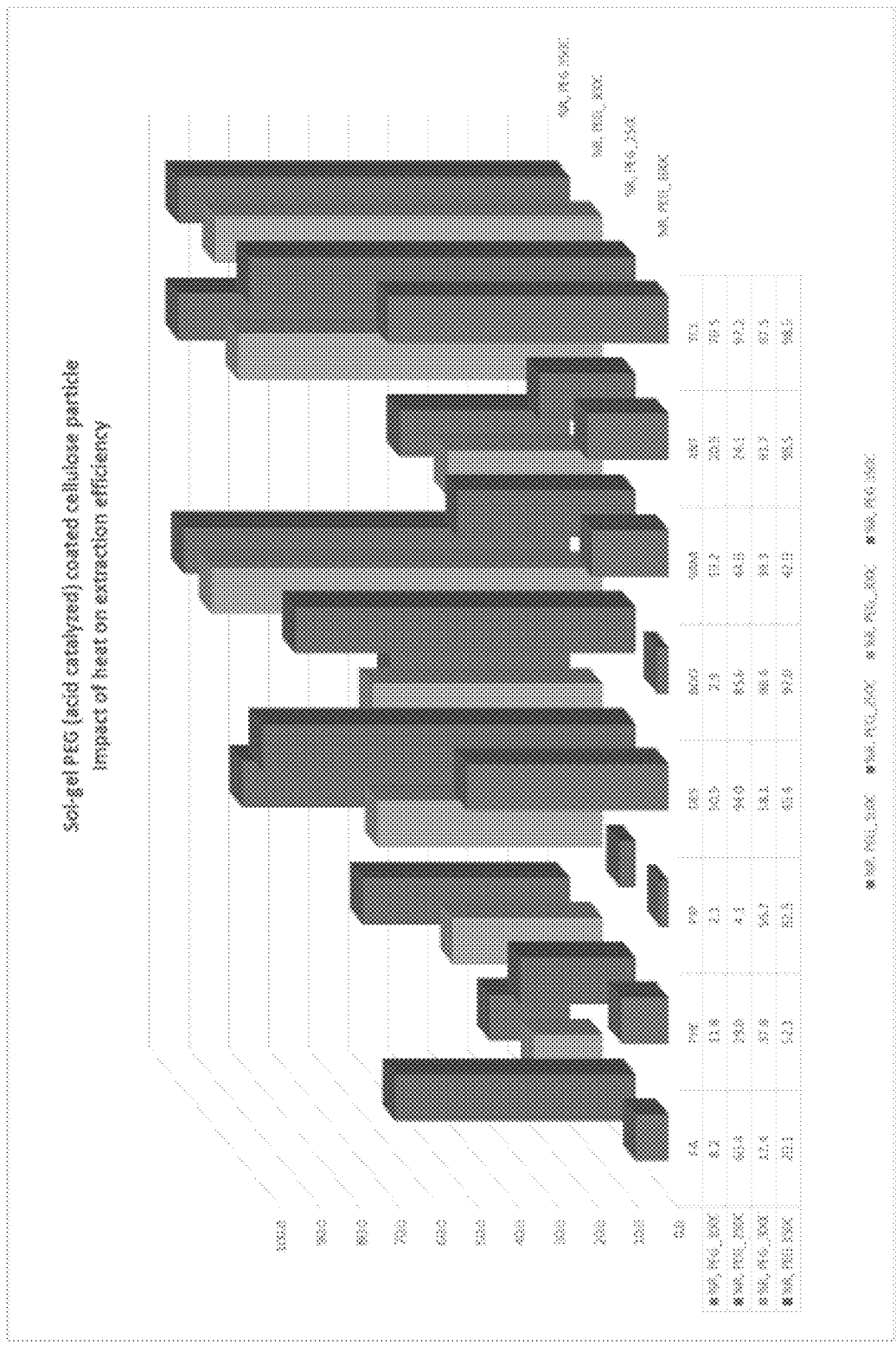
Figure 23:
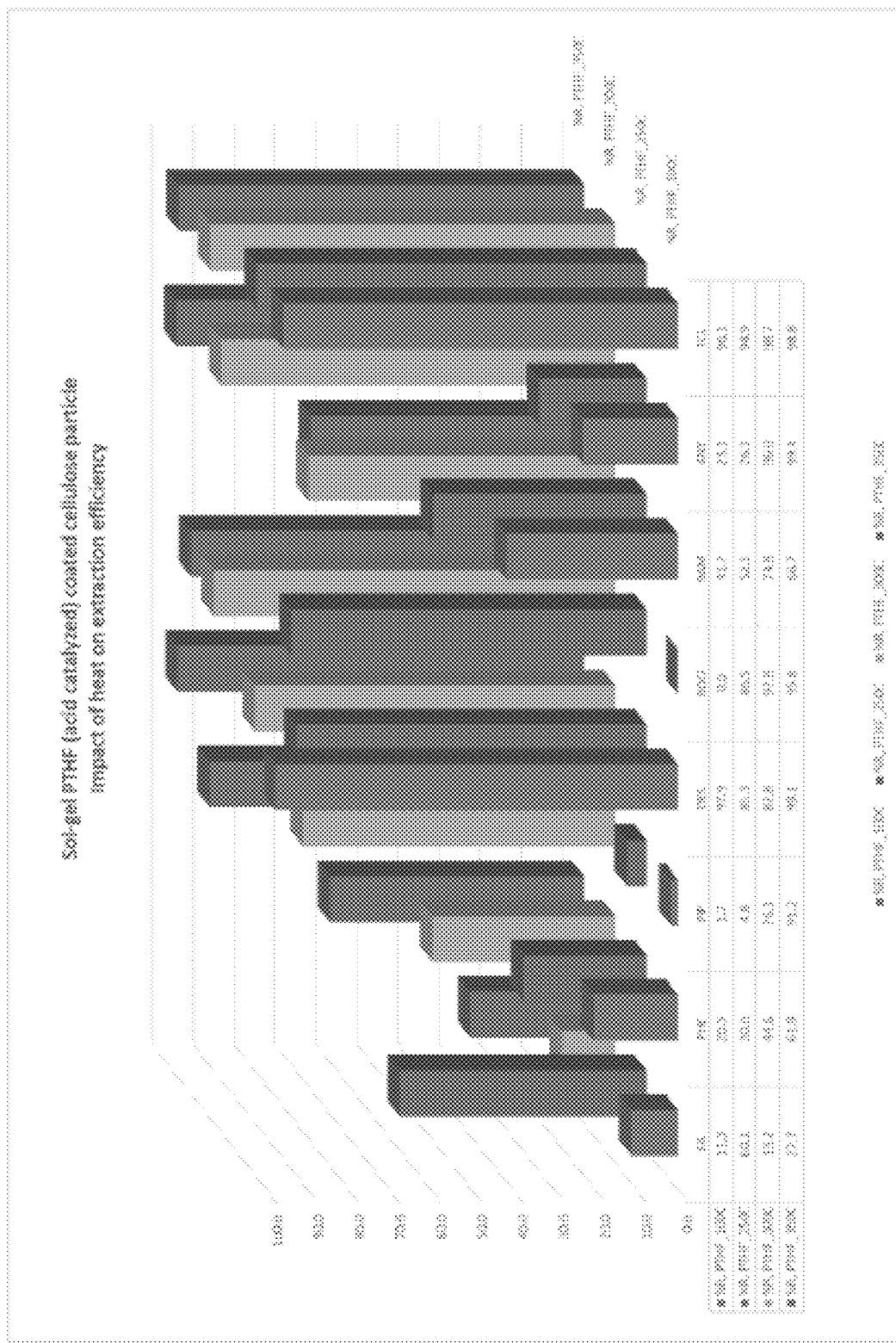
Figure 24:
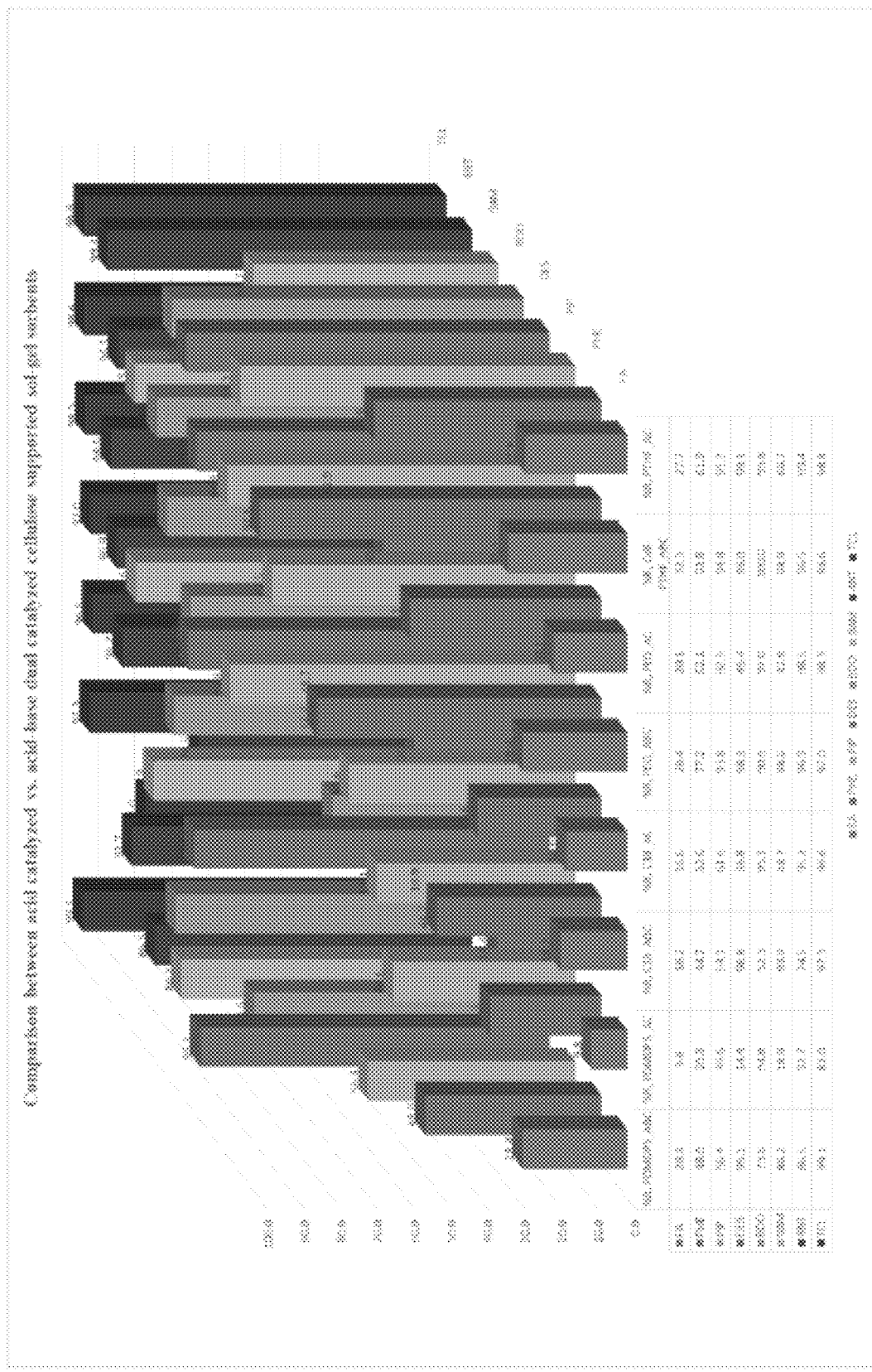
Figure 25:
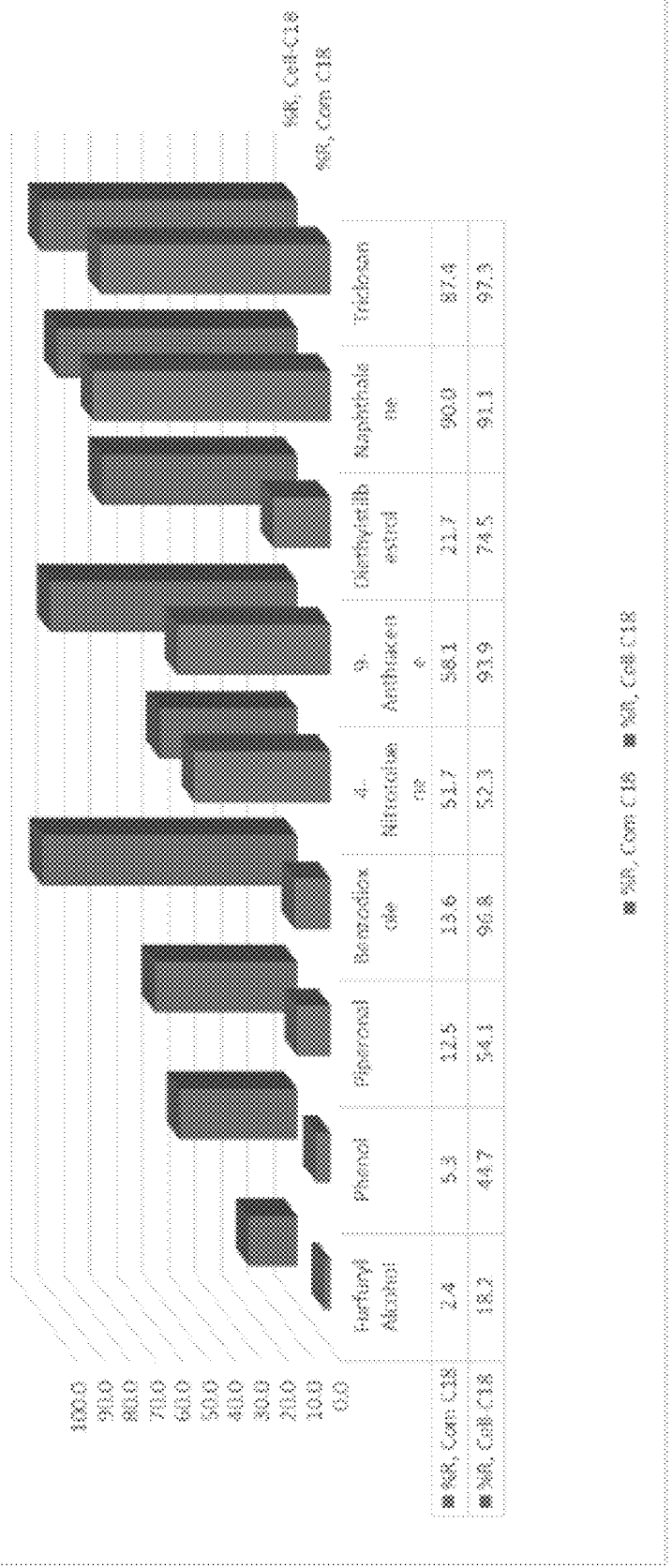
Figure 26:
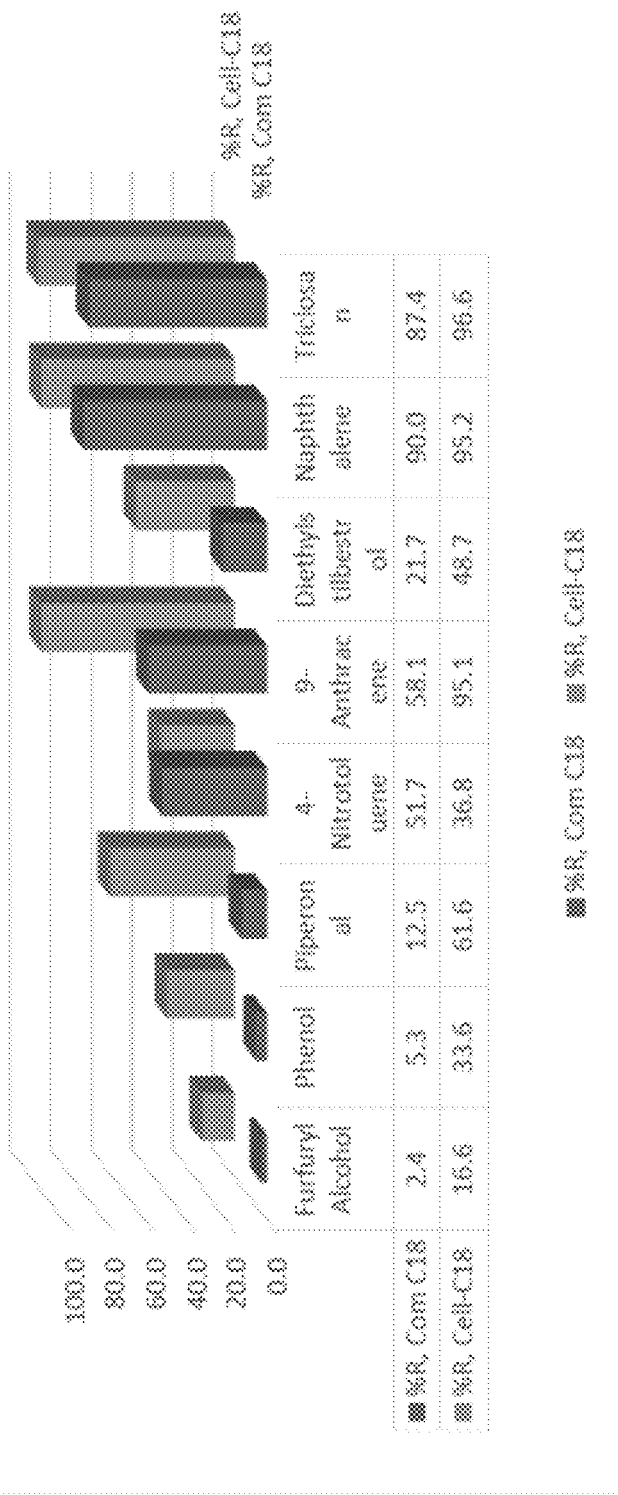
Figure 27:
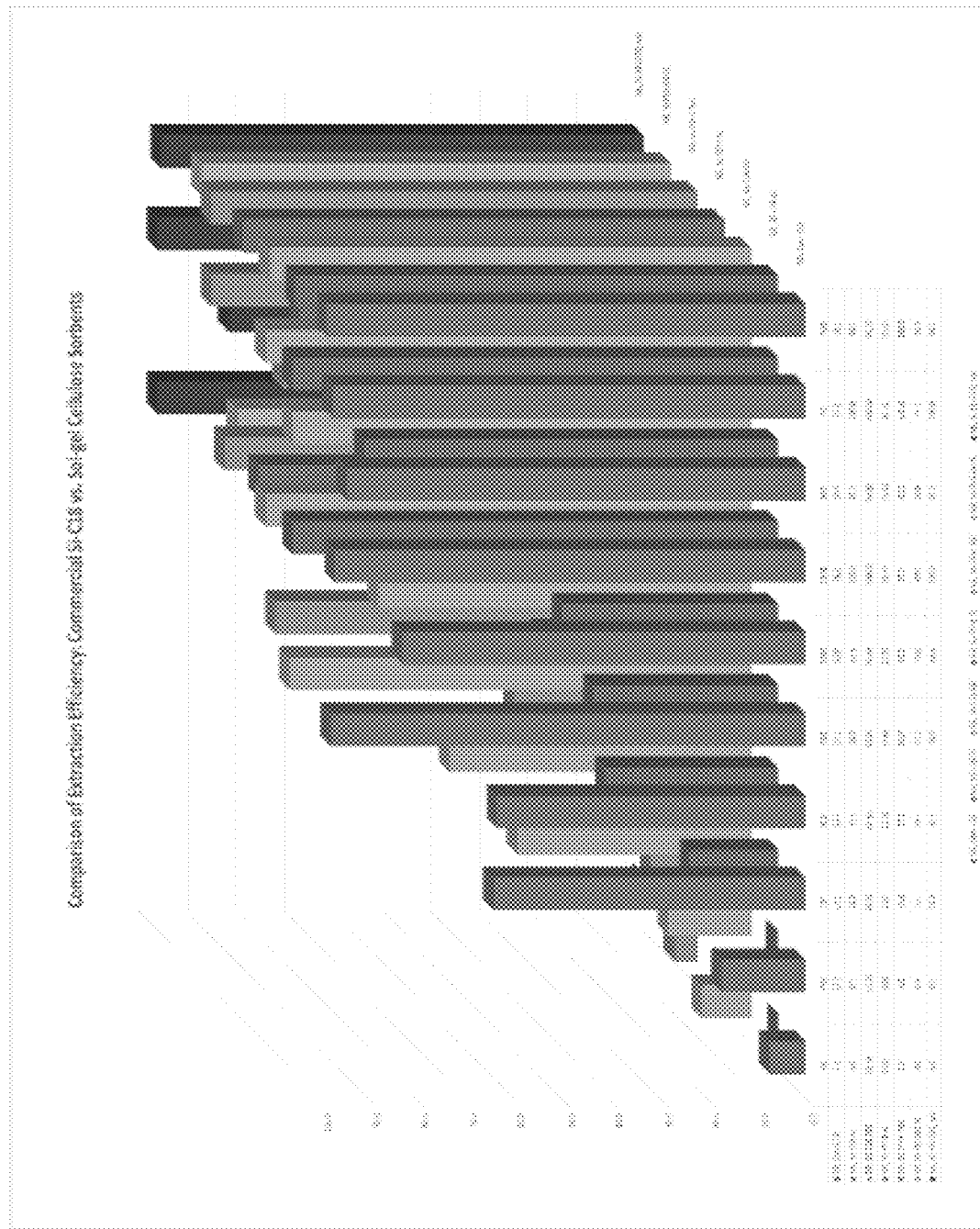

FIG. 15 shows the results, demonstrating that the acid-catalyzed sorbent coated cellulose particles and the acid-base dual catalyzed sol-gel sorbent coated cellulose particles of embodiments of the subject invention are stable at pH=1 and pH=13.

EXAMPLE 4

Study of Temperature Stability

A study of thermal stability of the acid-catalyzed sorbent coated cellulose particles and the acid-base dual catalyzed sol-gel sorbent coated cellulose particles was performed, where the sol-gel sorbent coated cellulose particles were exposed to (a) a temperature of 250° C. for 2 hours; (b) a temperature of 300° C. for 2 hours; and (c) a temperature of 350° C. for 2 hours. The study was carried out in a conditioning device built inside of a gas chromatography oven under continuous $N_2$ gas flow.

FIGS. 16-23 show the results, demonstrating that the acid-catalyzed sorbent coated cellulose particles and the acid-base dual catalyzed sol-gel sorbent coated cellulose particles of embodiments of the subject invention are stable at temperatures up to 350° C. or even slightly higher).

EXAMPLE 5

Evaluation of Extraction Performance

An evaluation of extraction performance of commercial C18, acid-catalyzed sorbents, and acid-base dual catalyzed sorbents was carried out by exposing 50 mg of precisely weighed sorbent to 10 mL of a 10 µg/mL aqueous solution of the test compounds listed in FIG. 14 for 1 hour with continuous magnetic stirring at 1000 revolutions per minute (rpm). The absolute recovery of the sorbents was calculated by analyzing the original solution and the residual solution after the extraction. % absolute recovery=[(concentration in the original solution−concentration in the residual solution)/ concentration in the original solution]*100%.

FIGS. 24-27 show the results, demonstrating that the acid-catalyzed sorbent coated cellulose particles and the acid-base dual catalyzed sol-gel sorbent coated cellulose particles of embodiments of the subject invention have excellent extraction efficiency.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of fabricating a solid phase extraction (SPE) sorbent or liquid chromatography (LC) stationary phase, the method comprising:
   activating microcrystalline cellulose particles by treatment with a solution;
   preparing a sol solution by dissolving a polymer in a first solvent with an acidic sol-gel catalyst;
   adding the activated microcrystalline cellulose particles to the sol solution such that the SPE sorbent or LC stationary phase is formed with the microcrystalline cellulose particles as a substrate; and utilizing the SPE sorbent or LC stationary phase in a separation process, the separation process being a high temperature liquid chromatography (HTLC) process, the HTLC process comprising: utilizing subcritical water as a second solvent in a mobile phase of the HTLC process; and increasing a temperature of the second solvent to 250° C.

2. The method according to claim 1, further comprising: cleaning the activated microcrystalline cellulose particles and drying the cleaned activated microcrystalline cellulose particles prior to adding to the sol solution.

3. The method according to claim 1, the first solvent being an organic solvent.

4. The method according to claim 1, the preparing of the sol solution comprising dissolving the polymer in the first solvent with the acidic sol-gel catalyst and a cross-linker.

5. The method according to claim 4, the cross-linker being methyltrimethoxysilane (MTMS), the first solvent being methylene chloride: acetone, and the acidic sol-gel catalyst being trifluoroacetic acid.

6. The method according to claim 5, the preparing of the sol solution further comprising:
vortexing a mixture formed when the polymer is dissolved in the first solvent with the acidic sol-gel catalyst and the cross-linker; and
centrifuging the mixture; and
transferring a clear supernatant of the sol solution to a container.

7. The method according to claim 6, the adding of the activated microcrystalline cellulose particles to the sol solution comprising adding the activated microcrystalline cellulose particles to the container such that a three-dimensional network of sol-gel sorbents is formed on a surface of the substrate and throughout a porous matrix of the substrate.

8. The method according to claim 7, further comprising cleaning the SPE sorbent or LC stationary phase by a first heating of the SPE sorbent or LC stationary phase, followed by rinsing with at least one rinsing solvent, and followed by a second heating of the rinsed SPE sorbent or LC stationary phase.

9. The method according to claim 4, the cross-linker being tetramethylorthosilicate (TMOS), the first solvent being 2-propanol, and the acidic sol-gel catalyst being hydrochloric acid.

10. The method according to claim 9, the preparing of the sol solution further comprising:
vortexing a mixture formed when the polymer is dissolved in the first solvent with the acidic sol-gel catalyst and the cross-linker; and
centrifuging the mixture;
heating the mixture; and
transferring a clear supernatant of the sol solution to a container.

11. The method according to claim 10, the adding of the activated microcrystalline cellulose particles to the sol solution comprising:
adding the activated microcrystalline cellulose particles to the container such that the microcrystalline cellulose particles are homogeneously dispersed into the sol solution; and
adding a base solution to the sol solution to form a solid mass; and
heating the solid mass.

12. The method according to claim 11, further comprising cleaning the SPE sorbent or LC stationary phase by crushing the solid mass into small pieces, rinsing the small pieces using a rinsing solvent, and heating the rinsed small pieces.

13. The method according to claim 11, the adding of the base solution causing a polycondensation reaction to form the solid mass.

14. The method according to claim 1, the polymer being octadecyl trimethoxysilane, polydimethyldiphenylsiloxane, polyethylene glycol, polytetrahydrofuran, (p-methyl phenyl) methyldimethoxysilane, 3,4-methylenedioxyphenyltriethoxysilane, hydroxyterminated poly(dimethyl siloxane), or monohydroxyterminated poly(dimethylsiloxane).

15. The method according to claim 1, further comprising cleaning the SPE sorbent or LC stationary phase.

16. A method of fabricating a solid phase extraction (SPE) sorbent or liquid chromatography (LC) stationary phase, the method comprising:
activating microcrystalline cellulose particles by treatment with a solution;
cleaning the activated microcrystalline cellulose particles and drying the cleaned activated microcrystalline cellulose particles;
preparing a sol solution by dissolving a polymer in a first solvent with an acidic sol-gel catalyst and a cross-linker;
adding the cleaned, dried, activated microcrystalline cellulose particles to the sol solution such that the SPE sorbent or LC stationary phase is formed with the microcrystalline cellulose particles as a substrate;
cleaning the SPE sorbent or LC stationary phase; and
utilizing the cleaned SPE sorbent or LC stationary phase in a separation process, the separation process being a high temperature liquid chromatography (HTLC) process,
the HTLC process comprising: utilizing subcritical water as a second solvent in a mobile phase process; and increasing a temperature of the second solvent to 250° C.,
the first solvent being an organic solvent, and
the polymer being octadecyl trimethoxysilane, polydimethyldiphenylsiloxane, polyethylene glycol, polytetrahydrofuran, (p-methyl phenyl) methyldimethoxysilane, 3,4-methylenedioxyphenyltriethoxysilane, hydroxyterminated poly(dimethyl siloxane), or monohydroxyterminated poly(dimethylsiloxane).

17. The method according to claim 16, the cross-linker being methyltrimethoxysilane (MTMS),
the first solvent being methylene chloride,
the acidic sol-gel catalyst being trifluoroacetic acid,
the preparing of the sol solution further comprising:
vortexing a mixture formed when the polymer is dissolved in the first solvent with the acidic sol-gel catalyst and the cross-linker;
centrifuging the mixture; and
transferring a clear supernatant of the sol solution to a container,
the adding of the cleaned, dried, activated microcrystalline cellulose particles to the sol solution comprising adding the cleaned, dried, activated microcrystalline cellulose particles to the container such that a three-dimensional network of sol-gel sorbents is formed on a surface of the substrate and throughout a porous matrix of the substrate, and
the cleaning of the SPE sorbent or LC stationary phase comprising a first heating of the SPE sorbent or LC stationary phase, followed by rinsing with at least one rinsing solvent, and followed by a second heating of the rinsed SPE sorbent or LC stationary phase.

18. The method according to claim 16, the cross-linker being tetramethylorthosilicate (TMOS),
- the first solvent being 2-propanol,
- the acidic sol-gel catalyst being hydrochloric acid,
- the preparing of the sol solution further comprising:
  - vortexing a mixture formed when the polymer is dissolved in the first solvent with the acidic sol-gel catalyst and the cross-linker; and
  - centrifuging the mixture;
  - heating the mixture; and
  - transferring a clear supernatant of the sol solution to a container,
- the adding of the cleaned, dried, activated microcrystalline cellulose particles to the sol solution comprising:
  - adding the cleaned, dried, activated microcrystalline cellulose particles to the container such that the microcrystalline cellulose particles are homogeneously dispersed into the sol solution;
  - adding a base solution to the sol solution to cause a polycondensation reaction to form a solid mass; and
  - heating the solid mass, and
- the cleaning of the SPE sorbent or LC stationary phase comprising crushing the solid mass into small pieces, rinsing the small pieces using a rinsing solvent, and heating the rinsed small pieces.

19. The method according to claim 16, the HTLC process utilizing the subcritical water with no additives as the second solvent in the mobile phase of the HTLC process.

20. The method according to claim 1, the HTLC process utilizing the subcritical water with no additives as the second solvent in the mobile phase of the HTLC process.

* * * * *